(12) United States Patent
Parker

(10) Patent No.: US 9,311,160 B2
(45) Date of Patent: Apr. 12, 2016

(54) ELASTIC CLOUD NETWORKING

(75) Inventor: Benjamin J. Parker, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 188 days.

(21) Appl. No.: 13/293,411

(22) Filed: Nov. 10, 2011

(65) Prior Publication Data
US 2013/0124712 A1 May 16, 2013

(51) Int. Cl.
*G06F 15/173* (2006.01)
*G06F 9/50* (2006.01)
*H04L 12/24* (2006.01)

(52) U.S. Cl.
CPC .......... *G06F 9/5072* (2013.01); *H04L 41/5038* (2013.01); *H04L 41/5051* (2013.01)

(58) Field of Classification Search
CPC ..... H04L 43/04; H04L 43/0876; H04L 43/08; G06F 11/34
USPC .................. 709/223, 224, 225, 203, 206, 226
See application file for complete search history.

(56) References Cited

U.S. PATENT DOCUMENTS

| | | | |
|---|---|---|---|
| 8,224,931 B1 | 7/2012 | Brandwine et al. | |
| 8,484,355 B1 | 7/2013 | Lochhead et al. | |
| 8,565,108 B1 | 10/2013 | Marshall et al. | |
| 8,671,176 B1 | 3/2014 | Kharitonov et al. | |
| 8,804,745 B1 | 8/2014 | Sinn | |
| 8,806,482 B1 | 8/2014 | Nagargadde et al. | |
| 2006/0155708 A1* | 7/2006 | Brown et al. | 707/10 |
| 2008/0295095 A1 | 11/2008 | Watanabe et al. | |
| 2009/0276771 A1 | 11/2009 | Nickolov et al. | |
| 2010/0332617 A1* | 12/2010 | Goodwin et al. | 709/219 |
| 2011/0022694 A1* | 1/2011 | Dalal et al. | 709/222 |
| 2011/0022812 A1 | 1/2011 | Van Der Linden et al. | |
| 2012/0089980 A1 | 4/2012 | Sharp et al. | |
| 2012/0110014 A1 | 5/2012 | Snelling | |
| 2012/0110394 A1* | 5/2012 | Murakami et al. | 714/48 |
| 2012/0290455 A1 | 11/2012 | Mays | |
| 2012/0304170 A1 | 11/2012 | Morgan | |
| 2013/0014033 A1 | 1/2013 | Hamick et al. | |
| 2013/0139158 A1 | 5/2013 | Astete et al. | |
| 2013/0276068 A1 | 10/2013 | Alwar | |

\* cited by examiner

*Primary Examiner* — Vivek Srivastava
*Assistant Examiner* — Normin Abedin

(57) ABSTRACT

A device receives network infrastructure requirements, and determines availabilities of network resources based on the network infrastructure requirements. The device recommends one or more of the network resources based on the availabilities of the network resources, and receives selection of particular network resources from the recommended one or more network resources. The device also connects the particular network resources to create a virtual network template, and verifies requirements for the particular network resources. The device further tests the virtual network template, and deploys the virtual network template via the particular network resources when the testing of the virtual network template is successful.

20 Claims, 19 Drawing Sheets

FIG. 6
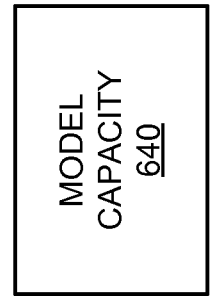
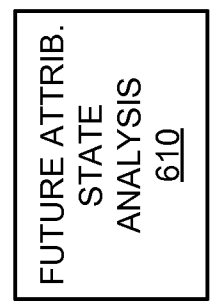
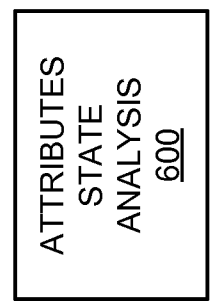

FIG. 8
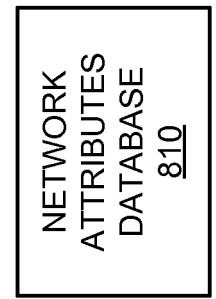
NETWORK ATTRIBUTES DATABASE 810
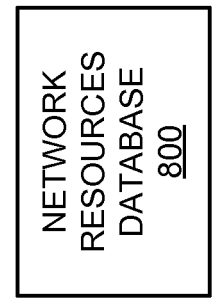
NETWORK RESOURCES DATABASE 800
430

FIG. 9

| COLLECTION PRIMITIVES 900 | BALANCING PRIMITIVES 910 | SESSION PRIMITIVES 920 | ANALYSIS PRIMITIVES 930 |

440

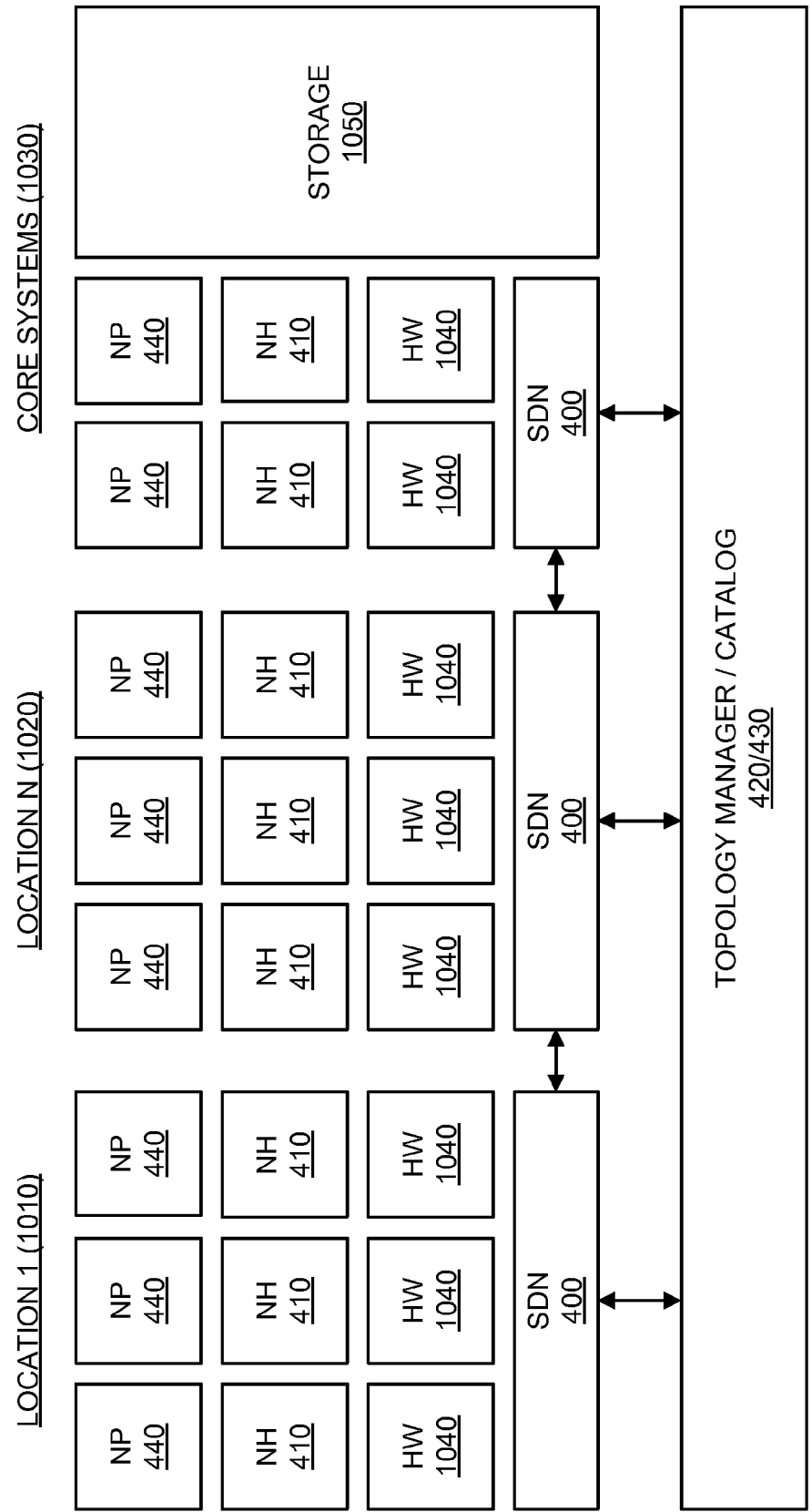

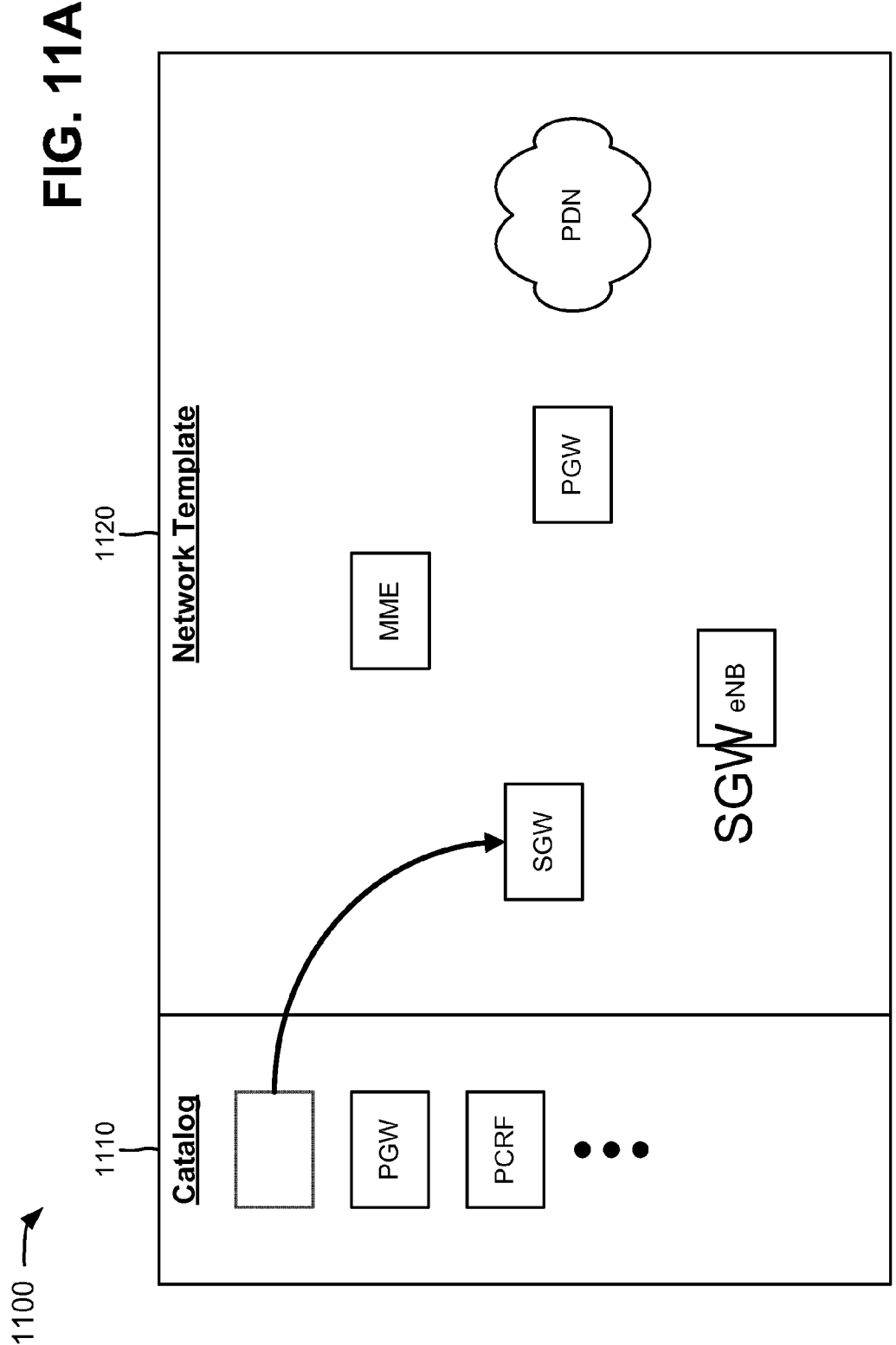

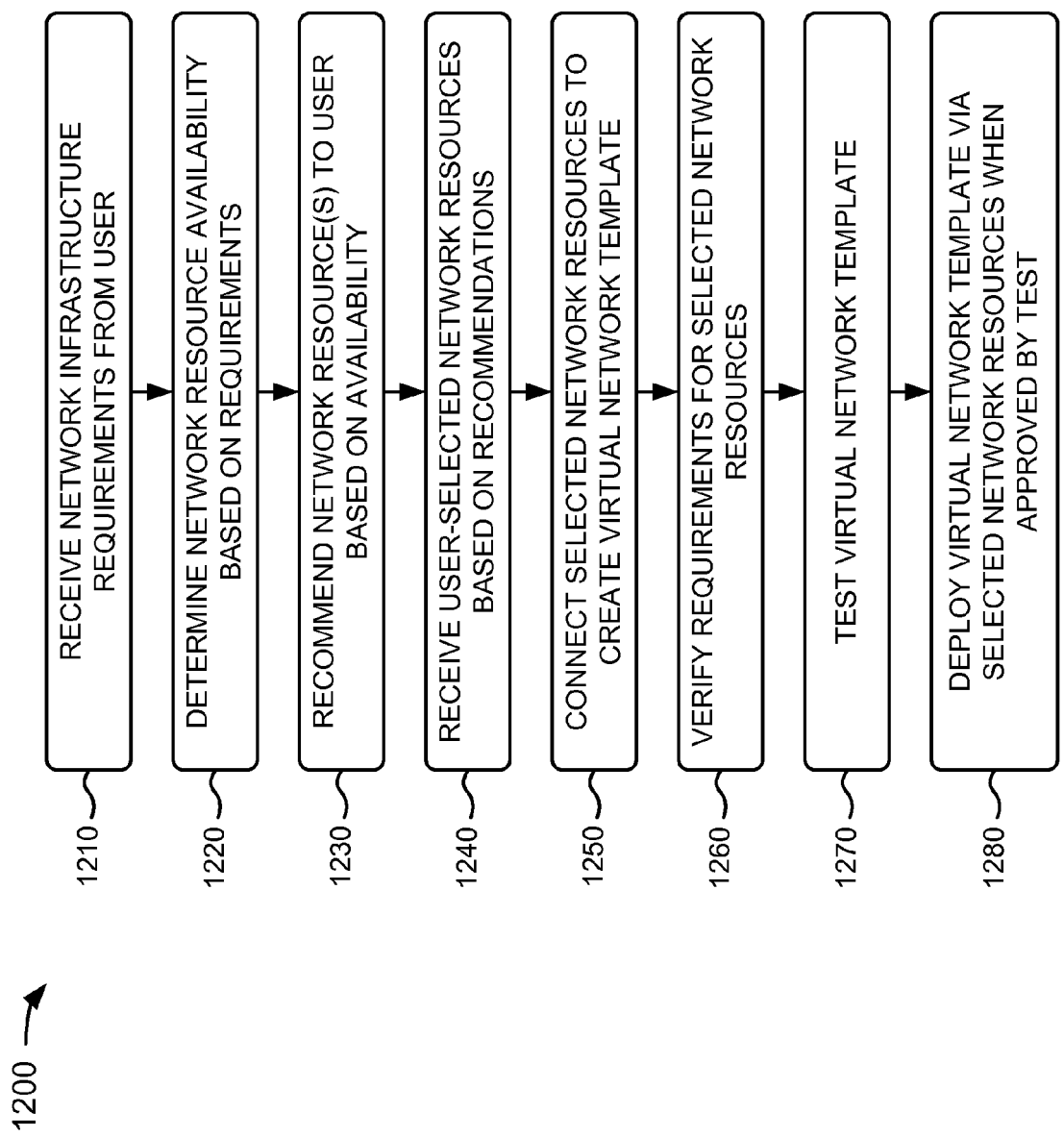

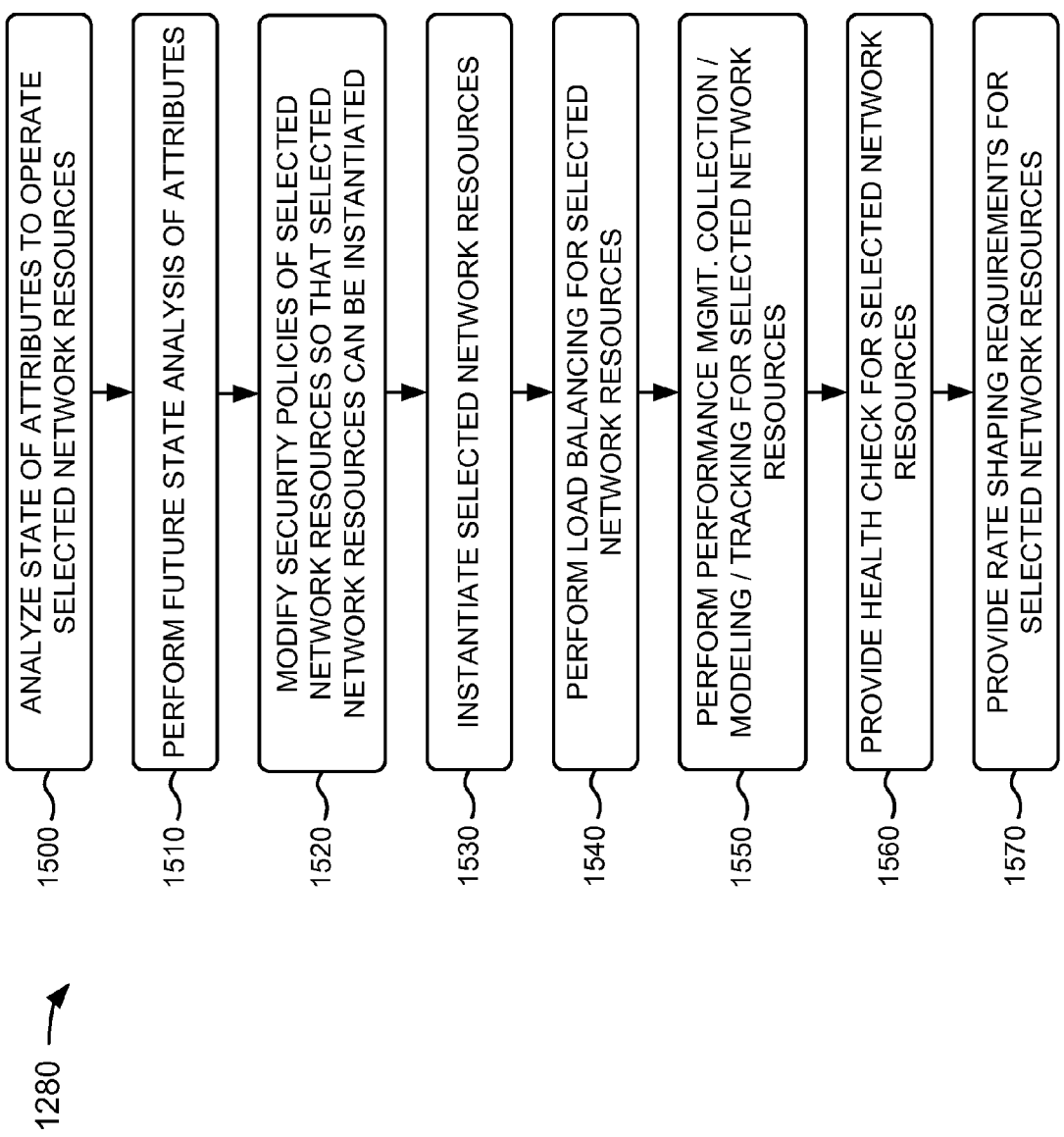

ELASTIC CLOUD NETWORKING

BACKGROUND

Network planning is required prior to installation of a dedicated network, such as a long term evolution (LTE) network or an evolved packet core (EPC) network. Network planning is a time consuming process that includes identifying necessary network resources and communications connections for the network, and determining appropriate locations for the network resources and the communications connections. Once the planning is complete, the network resources and the communications connections may be installed at the determined locations. Network installation is both a time consuming and an expensive process. However, such dedicated network resources and communications connections do not need to be installed when they are readily available in data centers.

A data center is a facility used to house computer systems and associated components, such as telecommunications devices and storage systems. A data center generally includes redundant or backup power supplies, redundant data communications connections, environmental controls (e.g., air conditioning, fire suppression, etc.), and security devices.

BRIEF DESCRIPTION OF THE DRAWINGS

FIG. 6 is a diagram of example functional components of a network hypervisor of the ECN device;

FIG. 8 is a diagram of example functional components of a catalog of the ECN device;

FIG. 9 is a diagram of example functional components of a network primitives component of the ECN device;

FIG. 10 is a diagram of example data flows between functional components of multiple ECN devices;

FIGS. 11A-11E are diagrams of example user interfaces capable of being provided by the ECN device; and FIGS. 12-15 are flow charts of an example process for providing elastic cloud networking according to an implementation described herein.

DETAILED DESCRIPTION OF PREFERRED EMBODIMENTS

Figure 1:
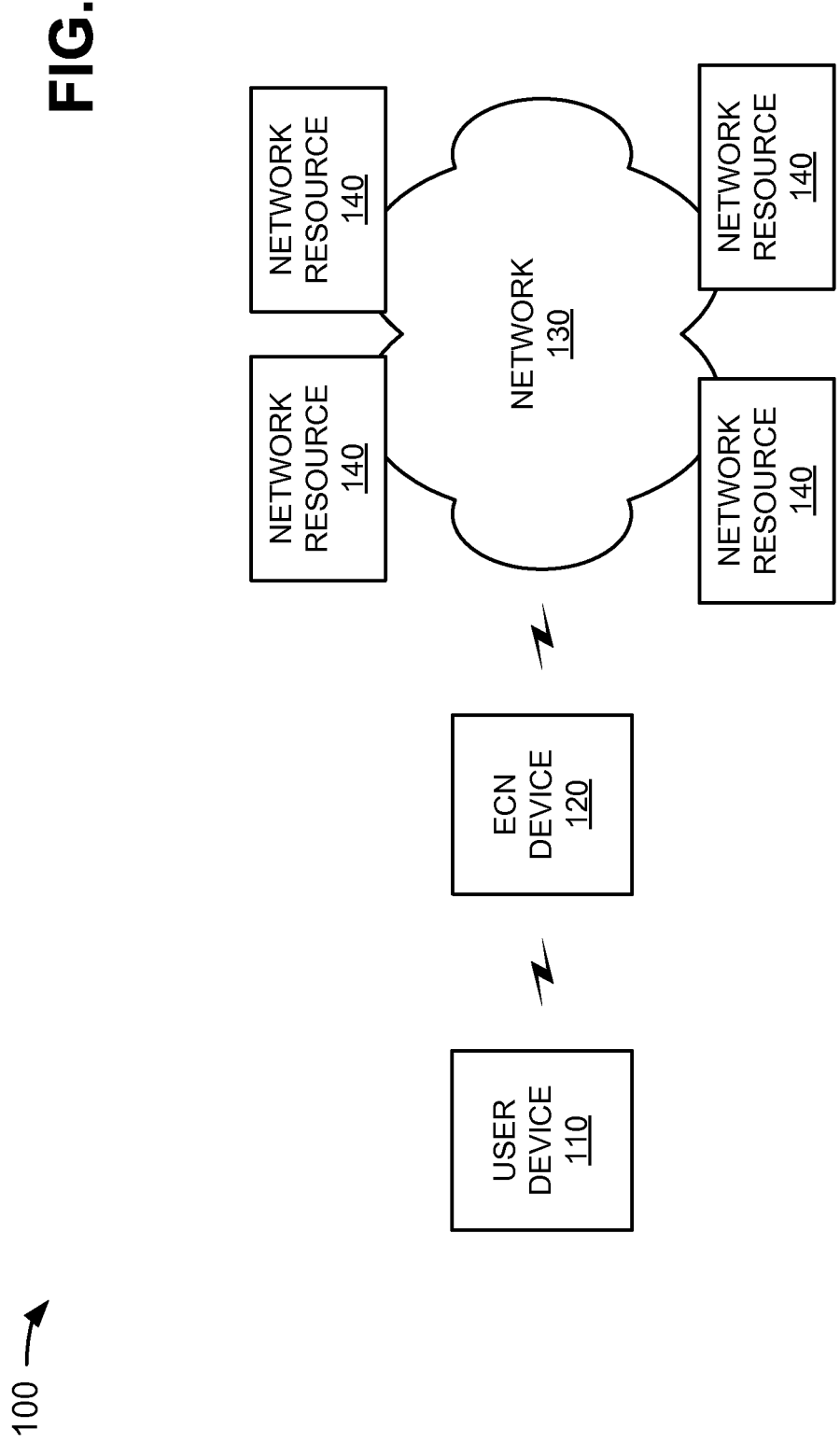
FIG. 1 is a diagram of an example network in which systems and/or methods described herein may be implemented.

The following detailed description refers to the accompanying drawings. The same reference numbers in different drawings may identify the same or similar elements.

Systems and/or methods described herein may provide a network architecture using cloud computing techniques (e.g., virtual machines (VMs), hypervisors, etc.) to operate, manage, and scale systems of the network architecture. The systems and/or methods may lay a foundation for a transition from dedicated hardware-based network systems to using data center class computer systems for virtual network implementation. The systems and/or methods may create highly scalable virtual networks with lower operational and capital costs than current dedicated networks, and may provide network primitives that collect operational information associated with the virtual networks.

The systems and/or methods may provide an elastic cloud network (ECN) device that includes a session delivery network (SDN) component, a network hypervisor, a topology manager, and a catalog. The SDN component may be responsible for managing network primitives, which may lay a foundation for virtualization of other systems. The SDN component may provide session continuity across a data center and/or a wide area. The network hypervisor may include virtualization-based distribution network infrastructure services, such as resource management, to dynamically and intelligently optimize available resources among virtual machines. The network hypervisor may provide service levels and data protection for reliable and cost effective disaster recovery, security, and integrity to protect an existing infrastructure from data center vulnerabilities. The topology manager and the catalog may permit users (e.g., network administrators) to manage the virtual systems as though the virtual systems were physically dedicated systems.

The systems and/or methods may create and operate a virtual network infrastructure that virtualizes and aggregates data center devices and attached networks and storage into unified resource pools. The systems and/or methods may support the virtual network infrastructure by providing compute oriented systems (e.g., Internet protocol (IP) multimedia subsystem (IMS), analytics, fault management, performance management, etc.) that are currently provided as standalone hardware and software solutions.

In one example implementation, an ECN device may receive network infrastructure requirements from a user, and may determine network resource availability based on the requirements. The ECN device may recommend network resources to the user based on the determined availability, and may receive user-selected network resources based on the recommendations. The ECN device may logically connect the selected network resources to create a virtual network template, and may verify requirements for the selected network resources. The ECN device may test the virtual network template, and may deploy the virtual network template, via the selected network resources, when the virtual network template is approved by the test.

As used herein, the term "user" is intended to be broadly interpreted to include a user device or an ECN device, or a user of a user device or an ECN device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

FIG. 1 is a diagram of an example network 100 in which systems and/or methods described herein may be implemented. As illustrated, network 100 may include a user device 110, an ECN device 120, and a network 130 that includes multiple network resources 140. Devices and/or networks of network 100 may interconnect via wired and/or wireless connections. One user device 110, one ECN device 120, one network 130, and four network resources 140 have been illustrated in FIG. 1 for simplicity. In practice, there may be more user devices 110, ECN devices 120, networks 130, and/or network resources 140.

User device 110 may include a radiotelephone; a personal communications system (PCS) terminal that may combine, for example, a cellular radiotelephone with data processing and data communications capabilities; a smart phone; a personal digital assistant (PDA) that can include, for example, one or more of a radiotelephone, a pager, Internet/intranet access, etc.; a laptop computer; a tablet computer; a desktop computer; a workstation computer; or other types of computation and/or communication devices. In one example, user device 110 may include a device that is capable of communicating with ECN device 120.

ECN device 120 may include one or more server devices, or other types of computation and/or communication devices, that gather, process, search, and/or provide information in a manner described herein. In one example implementation, ECN device 120 may create and operate a virtual network infrastructure that virtualizes and aggregates network resources 140 and attached networks (e.g., network 130) and storage into unified resource pools. ECN device 120 may provide a network architecture using cloud computing techniques to operate, manage, and scale systems of the network architecture. ECN device 120 may lay a foundation for a transition from dedicated hardware-based network systems to using data center class computer systems (e.g., network resources 140) for virtual network implementation. ECN device 120 may create highly scalable virtual networks with lower operational and capital costs than current dedicated networks, and may provide network primitives that collect operational information associated with the virtual networks.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks. In one example implementation, network 130 may include a network that interconnects network resources 140, such as data center class devices, together.

Network resource 140 may include a device (e.g., a network device, a server, a computer system, etc.), data (e.g., availability information, license information, etc.), a service (e.g., a load balancing service, network information collection, etc.), or any other type of resource available for a network. A network device may include a gateway, a router, a switch, a firewall, a network interface card (NIC), a hub, a bridge, a proxy server, a multiplexer, or some other type of device that processes and/or transfers traffic. In one example implementation, network resource 140 may include devices, data, services, etc. provided in one or more data centers.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
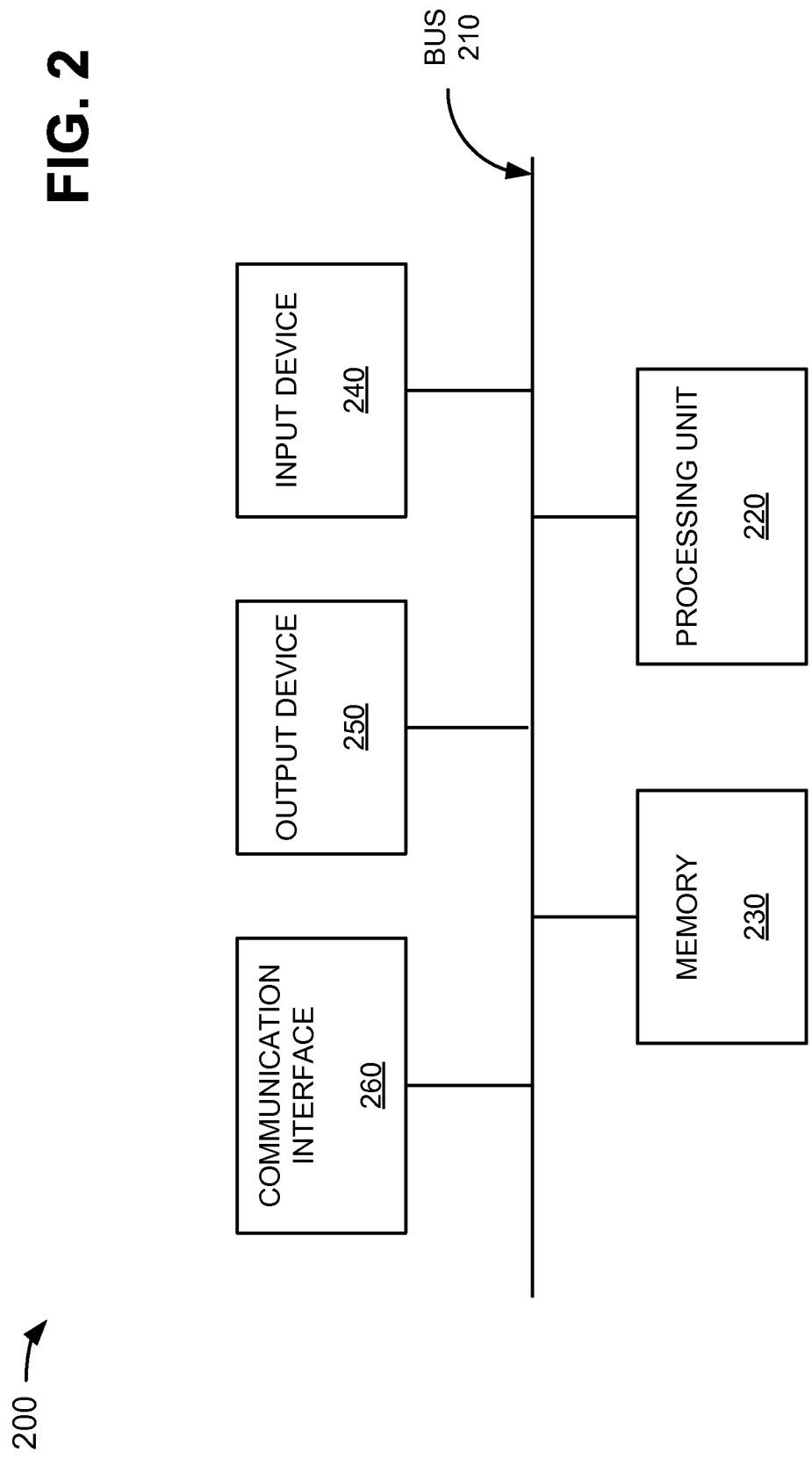
FIG. 2 is a diagram of example components of a device that may correspond to one of the devices of the network depicted in FIG. 1.

FIG. 2 is a diagram of example components of a device 200 that may correspond to one or more devices of network 100 (FIG. 1). In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
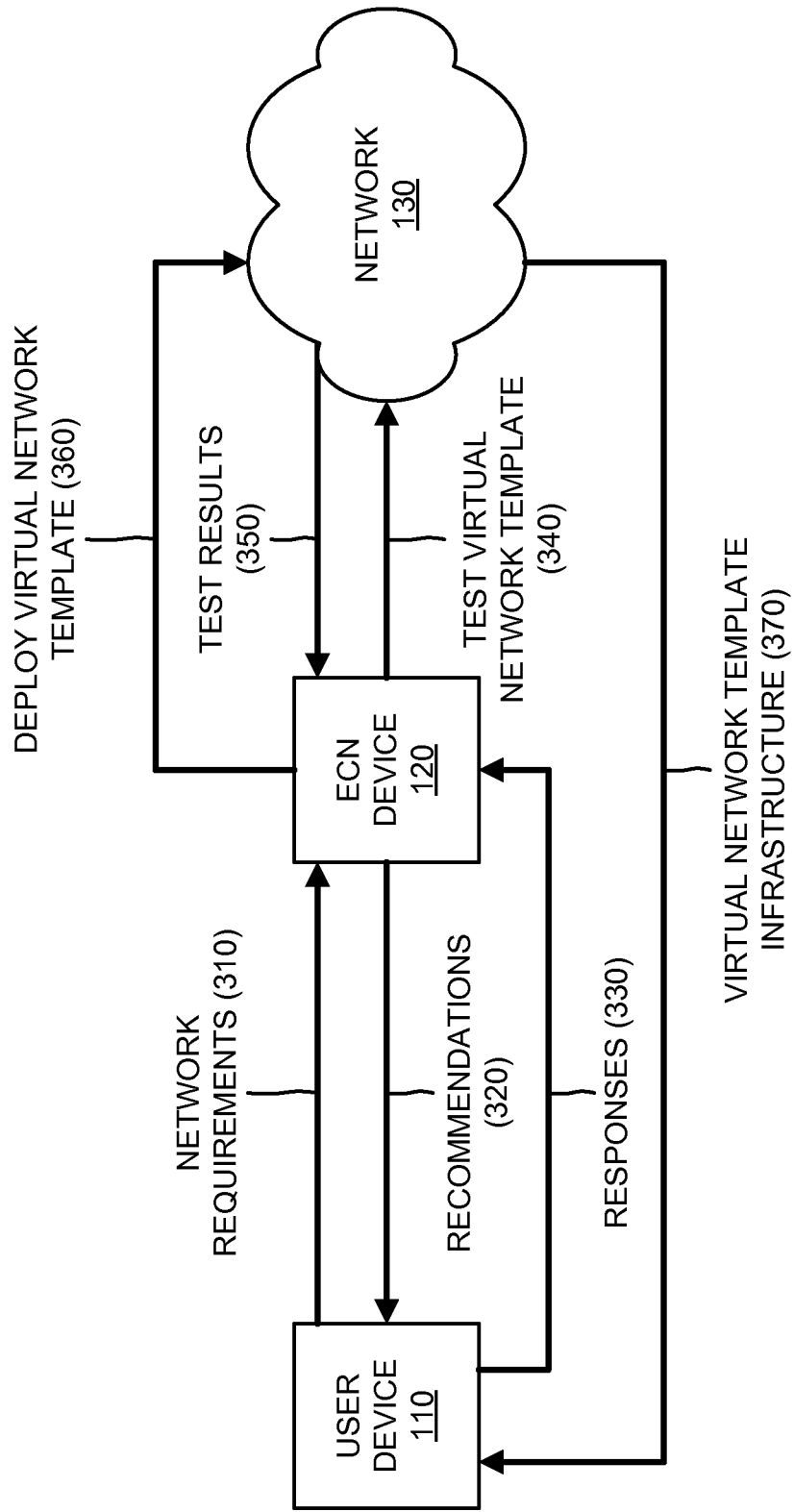
FIG. 3 is a diagram of example operations capable of being performed by an example portion of the network in FIG. 1.

FIG. 3 is a diagram of example operations capable of being performed by an example portion 300 of network 100 (FIG. 1). As shown, network portion 300 may include user device 110, ECN device 120, and network 130. User device 110, ECN device 120, and network 130 may include the features described above in connection with, for example, one or more of FIGS. 1 and 2.

With reference to FIG. 3, a user (not shown) of user device 110 may provide network requirements 310 to user device 110. Network requirements 310 may include information associated with a virtual network that the user wishes to implement, such as network resources 140 required for the virtual network, capabilities associated with network resources 140, interactions between network resources 140, network primitives to be used with the virtual network, etc. User device 110 may provide network requirements 310 to ECN device 120, and ECN device 120 may receive network requirements 310. ECN device 120 may determine availabilities associated with network resources 140 based on network requirements 310 in order to ensure that network 130 includes network resources 140 needed to employ the virtual network. Based on the availabilities of network resources 140, ECN device 120 may provide recommendations 320 to user device 110. Recommendations 320 may include a list of recommended network resources 140 of network 130 to be used in the requested virtual network.

User device 110 may receive recommendations 320, and the user may select, via user device 110, representations of one or more network resources 140 from the list of recommended network resources 140 provided in recommendations 320. The representations of the user-selected network resources 140 may be provided from user device 110 to ECN device 120 via one or more responses 330, and ECN device 120 may receive the representations of the user-selected network resources 140 via responses 330. ECN device 120 may logically connect the representations of the user-selected network resources 140 to create a virtual network template, and may verify requirements (e.g., memory, processor usage, bandwidth, etc.) for the user-selected network resources 140. Verification of the requirements for the user-selected network resources 140 may ensure that the user-selected network resources 140 may handle the requirements of the virtual network template.

ECN device 120 may test the virtual network template, as indicated by reference number 340, by testing the actual user-selected network resources 140 provided in network 130. For example, ECN device 120 may determine whether the actual user-selected network resources 140 function as set forth in network requirements 310. The testing of the actual user-selected network resources 140 may generate test results 350 that may be provided to ECN device 120. Test results 350 may include, for example, operational statistics (e.g., bandwidth, connectivity, flow rates, etc.) associated with the testing, errors (e.g., overload conditions, memory issues, etc.) encountered during the testing, etc.

If test results 350 indicate that the actual user-selected network resources 140 fail to function as set forth in network requirements 310 (i.e., a failure), ECN device 120 may provide different recommendations 320 to user device 110 based on test results 350 and may create a different virtual network template for testing. If test results 350 indicate that the actual user-selected network resources 140 function as set forth in network requirements 310 (i.e., a success), ECN device 120 may deploy the virtual network template in network 130, as indicated by reference number 360. For example, ECN device 120 may enable user device 110 to utilize the functionalities of the actual user-selected network resources 140, as set forth in network requirements 310. As shown in FIG. 3, network 130 may make infrastructure of network 130, associated with the virtual network template (e.g., the actual user-selected network resources 140 of network 130), available to user device 110, as indicated by reference number 370. User device 110 may utilize the virtual network infrastructure in a manner similar to a dedicated hardware-based network.

Although FIG. 3 shows example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

Figure 4:
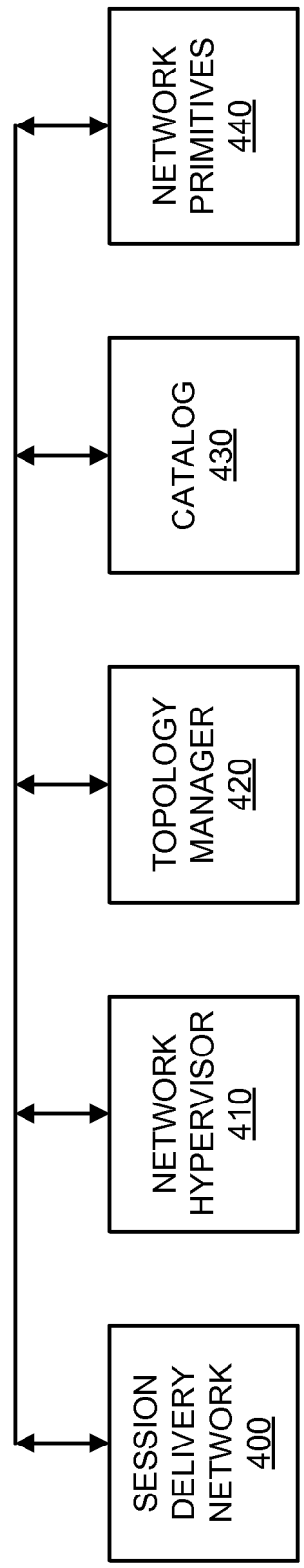
FIG. 4 is a diagram of example functional components of an elastic cloud network (ECN) device of FIG. 1.

FIG. 4 is a diagram of example functional components of ECN device 120. In one implementation, the functions described in connection with FIG. 4 may be performed by one or more components of device 200 (FIG. 2) or by one or more devices 200. As shown in FIG. 4, ECN device 120 may include a session delivery network (SDN) component 400, a network hypervisor 410, a topology manager 420, a catalog 430, and a network primitives component 440.

SDN component 400 may be responsible for managing network primitives that may be required to implement a scalable virtual network. SDN component 400 may also provide session continuity across network 130 and network resources 140, and may function as an interface to a transport network. SDN component 400 may provide transport from the network primitives to data storage devices, and may create a single virtual cluster across network 130. SDN component 400 may select appropriate network resources 140 based on requirements established in catalog 430, and may provide transport and security across network 130.

Network hypervisor 410 may provide virtualization-based distribution network infrastructure services, such as resource management, to dynamically and intelligently optimize available resources among virtual machines. Network hypervisor 410 may provide data protection for reliable and cost effective disaster recovery, security, and integrity to protect infrastructure of network 130 from data center vulnerabilities. In one example, network hypervisor 410 may provide carrier-grade network resource management that ensures that selected network resources 140 are allotted the appropriate processing, memory, and storage resources. Network hypervisor 410 may enable network administrators to operate and troubleshoot virtual networks using similar tools and procedures used for dedicated hardware-based networks. Network hypervisor 410 may work in concert with SDN component 400, topology manager 420, and network resources 140 to provide carrier class features that implement a virtual network.

Topology manager 420 may permit users (e.g., network administrators) to manage virtual systems created in network 130 as though the virtual systems were physically dedicated systems. Topology manager 420 may enable users (e.g., via user interfaces) to specify and view a logical network topology and how the logical network topology translates to a virtual network topology. For example, topology manager 420 may enable a user to select which network resources 140 of network 130 to utilize and how the selected network resources 140 are to interact with other network resources 140 associated with other virtual systems. Topology manager 420 may provide the topology to SDN component 400, network hypervisor 410, and other systems in order to create a complete virtual network. Topology manager 420 may create a formatted high level design (HLD) document of the virtual network that may be used to assist in trouble-shooting the virtual network.

Catalog 430 may include representations of network resources 140, capability information associated with network 130, availability information associated with network resources 140, license status information associated with network resources 140, operating requirements of network 130, etc. Catalog 430 may provide such information to a user (e.g., via user device 110), to SDN component 400, to network hypervisor 410, and to topology manager 420 so that virtual networks may be created and managed.

Network primitives component 440 may provide network primitives that may be accessed and utilized as needed by virtual networks. The network primitives may provide a variety of services, such as fault management collection, performance management collection, load balancing, etc. In one example, the network primitives may collect fault management and performance management data, and may transport the data to one or more storage devices for analysis by ECN device 120 or by a user. The network primitives may be automatically instantiated when a virtual network device is instantiated, and IP addresses for the network primitives may be presented by topology manager 420.

Although FIG. 4 shows example functional components of ECN device 120, in other implementations, ECN device 120 may include fewer functional components, different functional components, differently arranged functional components, or additional functional components than depicted in FIG. 4. Additionally, or alternatively, one or more functional components of ECN device 120 may perform one or more other tasks described as being performed by one or more other functional components of ECN device 120.

Figure 5:
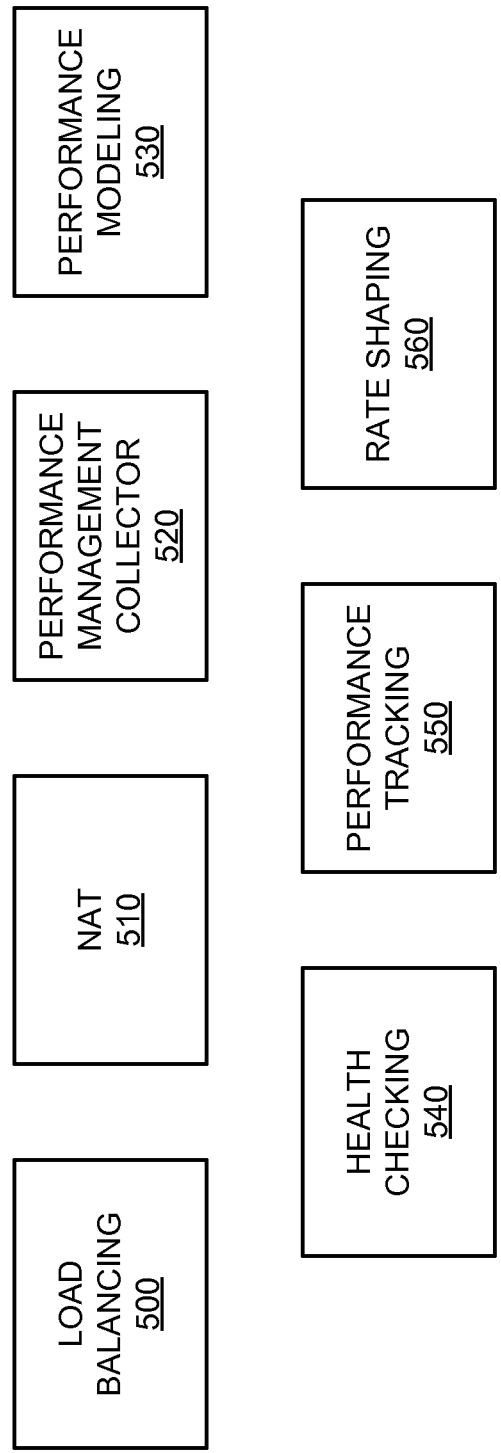
FIG. 5 is a diagram of example functional components of a session delivery network (SDN) component of the ECN device.

FIG. 5 is a diagram of example functional components of SDN component 400. In one implementation, the functions described in connection with FIG. 5 may be performed by one or more components of device 200 (FIG. 2) or by one or more devices 200. As shown in FIG. 5, SDN component 400 may include a load balancing component 500, a network address translation (NAT) component 510, a performance management collector 520, a performance modeling component 530, a health checking component 540, a performance tracking component 550, and a rate shaping component 560.

Load balancing component 500 may perform load balancing services for network resources 140 provided in a virtual network. For example, load balancing component 500 may distribute workload across multiple network resources 140 to achieve optimal network resource utilization, maximize throughput, minimize response time, and avoid overload. In one example implementation, load balancing component 500 may employ different load balancing techniques, such as domain name system (DNS) based load balancing, hardware based load balancing, and/or software based load balancing.

NAT component 510 may perform NAT services for network resources 140 provided in a virtual network. For example, NAT component 510 may modify IP address information in IP packet headers while in transit across traffic routing devices, such as network resources 140. In one example implementation, NAT component 510 may employ different NAT techniques, such as NAT 444 techniques, NAT 446 techniques, etc.

Performance management collector 520 may collect performance management information associated with network resources 140 provided in a virtual network. For example, performance management collector 520 may perform NetFlow-based traffic collection, simple network management protocol (SNMP)-based traffic collection, session initiation protocol (SIP) flow information exchange (SIPFix)-based traffic collection, pilot packet-based traffic collection, etc. associated with network resources 140 provided in the virtual network.

Performance modeling component 530 may provide performance modeling for network resources 140 provided in a virtual network. For example, performance modeling component 530 may determine when a virtual network may scale (e.g., grow or shrink) based on the performance modeling. Performance modeling component 530 may determine what SDN component 400 resources to scale when new network resources 140 are provided in network 130.

Health checking component 540 may perform health checking services for network resources 140 provided in a virtual network. For example, health checking component 540 may perform a health check on network resources 140 with a particular frequency, using a particular protocol, and using particular actions.

Performance tracking component 550 may provide performance tracking services for network resources 140 provided in a virtual network. For example, performance tracking component 550 may perform session and flow latency tracking, session and flow packet loss tracking, etc. for network resources 140 provided in a virtual network.

Rate shaping component 560 may perform rate shaping services for network resources 140 provided in a virtual network. For example, rate shaping component 560 may manage bandwidth associated with network resources 140 to ensure that priority applications are delivered without delay. For network 130 and network resources 140, rate shaping component 560 may ensure quality of service (QoS), may defend against bandwidth-abusing denial of service (DoS) attacks, and may protect against traffic spikes, abusive users, and network attacks.

Although FIG. 5 shows example functional components of SDN component 400, in other implementations, SDN component 400 may include fewer functional components, different functional components, differently arranged functional components, or additional functional components than depicted in FIG. 5. Additionally, or alternatively, one or more functional components of SDN component 400 may perform one or more other tasks described as being performed by one or more other functional components of SDN component 400.

FIG. 6 is a diagram of example functional components of network hypervisor 410. In one implementation, the functions described in connection with FIG. 6 may be performed by one or more components of device 200 (FIG. 2) or by one or more devices 200. As shown in FIG. 6, network hypervisor 410 may include an attributes state analysis component 600, a future attributes state analysis component 610, a virtual network operation component 620, a security policy component 630, and a model capacity component 640.

Attributes state analysis component 600 may analyze a current state of attributes associated with operation of network resources 140 of virtual networks. For example, attributes state analysis component 600 may analyze a current state of bandwidth, processor utilization, memory utilization, concurrent flows, etc. associated with network resources 140 of the virtual networks.

Future attributes state analysis component 610 may analyze a future (or predictive) state of attributes associated with operation of network resources 140 of virtual networks. For example, future attributes state analysis component 610 may analyze a future state of bandwidth, processor utilization, memory utilization, concurrent flows, etc. associated with network resources 140 of the virtual networks.

Virtual network operation component 620 may implement network resources 140 of virtual networks, and may ensure that network resources 140 are operating properly. Virtual network operation component 620 may ensure the health of network resources 140 while network resources 140 are being used for the virtual networks.

Security policy component 630 may modify security policies of particular network resources 140 (e.g., switches, firewalls, etc.) so that network resources 140 of virtual networks may be implemented in accordance with security policies.

Model capacity component 640 may model a capacity of network resources 140 of virtual networks in near real time. In one example, model capacity component 640 may plan for the growth or reduction of network resources 140 of the virtual networks based on the modeled capacity.

Although FIG. 6 shows example functional components of network hypervisor 410, in other implementations, network hypervisor 410 may include fewer functional components, different functional components, differently arranged functional components, or additional functional components than depicted in FIG. 6. Additionally, or alternatively, one or more functional components of network hypervisor 410 may perform one or more other tasks described as being performed by one or more other functional components of network hypervisor 410.

Figure 7:
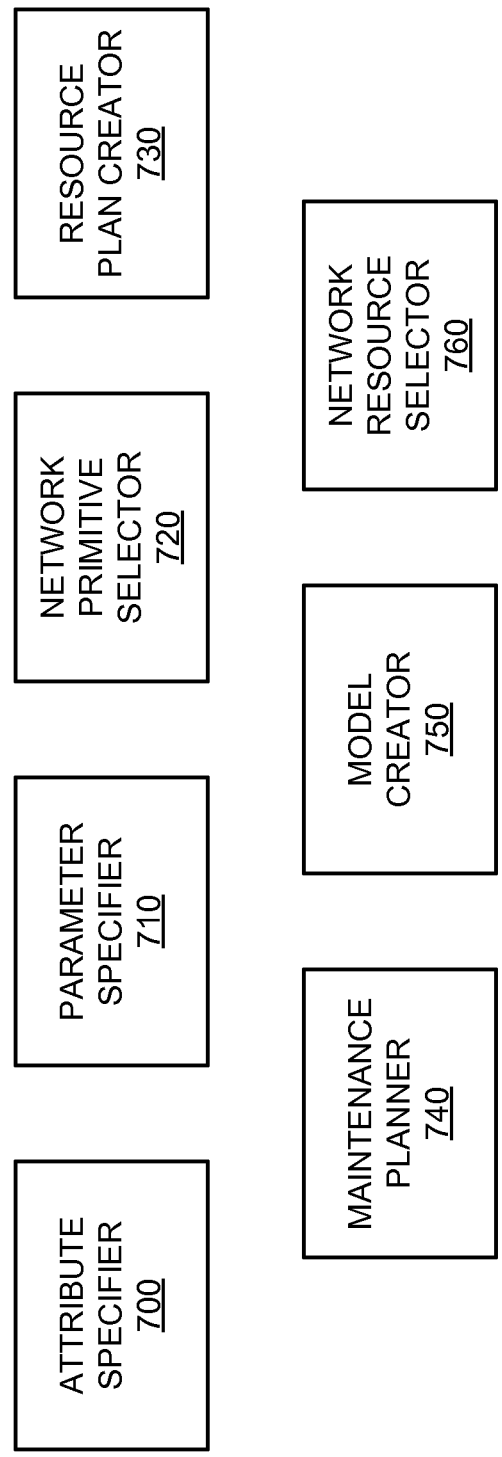
FIG. 7 is a diagram of example functional components of a topology manager of the ECN device.

FIG. 7 is a diagram of example functional components of topology manager 420. In one implementation, the functions described in connection with FIG. 7 may be performed by one or more components of device 200 (FIG. 2) or by one or more devices 200. As shown in FIG. 7, topology manager 420 may include an attribute specifier 700, a parameter specifier 710, a network primitive selector 720, a resource plan creator 730, a maintenance planner 740, a model creator 750, and a network resource selector 760.

Attribute specifier 700 may enable a user to specify network attributes that are required to deploy network resources 140 in virtual networks. In one example, the network attributes may include common language location identifier (CLLI) codes, locations of virtual resource pools, system types, operational status information, bearer IP addresses, management IP addresses, etc. associated with network resources 140.

Parameter specifier 710 may enable a user to specify parameters associated with network resources 140 in virtual networks. In one example, the parameters may include fault management parameters; performance management parameters; sample rates associated with the fault management and performance management parameters; protocols (e.g., SNMP) associated with the fault management and performance management parameters; failover requirements; scaling parameters (e.g., maximum number of flows, maximum processor utilization, maximum memory utilization, scaling trigger points, maximum number of virtual instances per location, etc.); upgrade and downgrade information; etc. associated with network resources 140.

Network primitive selector 720 may work with SDN component 400 to select and implement appropriate network primitives in concert with the implementation of network resources 140 of virtual networks.

Resource plan creator 730 may prepare a resource plan that determines all required resources when a network resource 140 for a virtual network is established. In one example, the required resources may include a number of processors, memory, storage, transport information, security information, etc. associated with an established network resource 140 for a virtual network.

Maintenance planner 740 may work with SDN component 400 to plan maintenance events for network resources 140 of virtual networks. For example, the maintenance events may include an upgrade to a virtual network, a downgrade to a virtual network, removal of one or more network resources 140 from a virtual network, etc. Maintenance planner 740 may generate a step-by-step maintenance operation program (MOP) that may be approved by specific personnel before the MOP may be executed.

Model creator 750 may prepare predictive analytics-based models that provide past, present, and/or future scale and performance information associated with virtual networks. In one example, the models may include information, such as flow counts, bandwidth, flow durations, national, regional, and instance level views, etc. associated with the virtual networks.

Network resource selector 760 may permit the provisioning of virtual services across network 130, and may permit a user to designate network resources 140 to be used or may automatically select or suggest network resources 140 to the user. Network resource selector 760 may determine whether to suggest network resources 140 to the user based on processor capacity, memory resources, SDN transport resource capacity, storage capacity, switch capacity, proximity to non-virtual resources, etc. associated with network resources 140.

Although FIG. 7 shows example functional components of topology manager 420, in other implementations, topology manager 420 may include fewer functional components, different functional components, differently arranged functional components, or additional functional components than depicted in FIG. 7. Additionally, or alternatively, one or more functional components of topology manager 420 may perform one or more other tasks described as being performed by one or more other functional components of topology manager 420.

FIG. 8 is a diagram of example functional components of catalog 430. In one implementation, the functions described in connection with FIG. 8 may be performed by one or more components of device 200 (FIG. 2) or by one or more devices 200. As shown in FIG. 8, catalog 430 may include a network resources database 800 and a network attributes database 810.

Network resources database 800 may include a database of information associated with network resources 140 (e.g., representations of network resources 140) that may be under the control of network hypervisor 410. When a new network resource 140 is deployed in network 130, information associated with the new network resource 140 may be added to network resources database 800 once the new network resource 140 is certified as generally available by appropriate users. If information associated with a particular network resource 140 is provided in network resources database 800 and the particular network resource 140 has not been certified as generally available, the particular network resource 140 may not be assigned to a virtual network. Information associated with a particular network resource 140 may be removed from network resources database 800 by particular network administrators.

Network attributes database 810 may include a database of attributes of network resources 140 provided in network 130. The attributes may include, for example, manufacturer names, functions, software versions, license keys, scaling metrics, test and acceptance states, location dependencies, resource specific health checks, critical triggers, etc. associated with network resources 140.

Although FIG. 8 shows example functional components of catalog 430, in other implementations, catalog 430 may include fewer functional components, different functional components, differently arranged functional components, or additional functional components than depicted in FIG. 8. Additionally, or alternatively, one or more functional components of catalog 430 may perform one or more other tasks described as being performed by one or more other functional components of catalog 430.

FIG. 9 is a diagram of example functional components of network primitives component 440. In one implementation, the functions described in connection with FIG. 9 may be performed by one or more components of device 200 (FIG. 2) or by one or more devices 200. As shown in FIG. 9, network primitives component 440 may include a collection primitives component 900, a balancing primitives component 910, a session primitives component 920, and an analysis primitives component 930.

Collection primitives component 900 may provide network primitives that perform collection services for network resources 140 in virtual networks. In one example, the collection services may include NetFlow-based traffic collection, SNMP-based traffic collection, SIPFix-based traffic collection, Syslog traffic collection, etc. associated with network resources 140 provided in the virtual networks.

Balancing primitives component 910 may provide network primitives that perform balancing services for network resources 140 in virtual networks. In one example, the balancing services may include flow tracing and troubleshooting services, local load balancing services, global load balancing services, etc. associated with network resources 140 provided in the virtual networks.

Session primitives component 920 may provide network primitives that perform session related services for network resources 140 in virtual networks. In one example, the session related services may include Layer 5 session continuity services, session chaining services, transmission control protocol (TCP) optimization services, NAT services, etc. associated with network resources 140 provided in the virtual networks.

Analysis primitives component 930 may provide network primitives that perform analysis services for network resources 140 in virtual networks. In one example, the analysis services may include latency tracking and analysis, packet loss tracking and analysis, etc. associated with network resources 140 provided in the virtual networks.

Although FIG. 9 shows example functional components of network primitives component 440, in other implementations, network primitives component 440 may include fewer functional components, different functional components, differently arranged functional components, or additional functional components than depicted in FIG. 9. Additionally, or alternatively, one or more functional components of network primitives component 440 may perform one or more other tasks described as being performed by one or more other functional components of network primitives component 440.

FIG. 10 is a diagram of example data flows 1000 between functional components of multiple ECN devices 120. As shown, a first ECN device 120 may be provided at a first location 1010, a second ECN device 120 may be provided at a second location 1020, and a third ECN device 120 may be provided at a third location 1030 (e.g., a core systems location). Each ECN device 120 may include hardware (HW) 1040, SDN component 400, network hypervisors (NH) 410, and network primitives components (NP) 440. The third ECN device 120 may include a storage component 1050. ECN devices 120 may share a common topology manager 420 and/or catalog 430. ECN devices 120, SDN components 400, network hypervisors 410, topology manager 420, catalog 430, and network primitives components 440 may include the features described above in connection with, for example, one or more of FIGS. 1-9.

Hardware 1040 may include hardware components associated with network resources 140 provided in network 130. Storage 1050 may include a memory device that stores information associated with virtual networks created and managed by ECN devices 120. As shown in FIG. 10, a common topology manager 420 and/or catalog 430 may be provided for multiple ECN devices 120 so that the virtual networks created by ECN devices 120 may share network resources 140 without conflicts. Topology manager 420/catalog 430 may communicate with SDN components 400 of different ECN devices 120 to ensure that network resources 140 are shared without conflicts. SDN components 400 may communicate with each other to ensure that network resources 140 are shared without conflicts.

Although FIG. 10 shows example data flows 1000 between functional components of multiple ECN devices 120, in other implementations, fewer data flows, different data flows, differently arranged data flows, or additional data flows, than depicted in FIG. 10, may be provided between the functional components of ECN devices 120.

FIGS. 11A-11E are diagrams of example user interfaces 1100 capable of being provided by ECN device 120. User interfaces 1100 may include graphical user interfaces (GUIs) or non-graphical user interfaces, such as text-based interfaces. User interfaces 1100 may provide information to users via customized interfaces (e.g., proprietary interfaces) and/or other types of interfaces (e.g., browser-based interfaces, etc.). User interfaces 1100 may receive user inputs via one or more input devices (e.g., input device 240, FIG. 2), may be user-configurable (e.g., a user may change the size of user interfaces 1100, information displayed in user interfaces 1100, color schemes used by user interfaces 1100, positions of text, images, icons, windows, etc., in user interfaces 1100, etc.), and/or may not be user-configurable. Information associated with user interfaces 1100 may be selected and/or manipulated by a user of user device 110 and/or ECN device 120 (e.g., via a touch screen display, a mouse, and/or a keyboard).

As shown in FIG. 11A, user interface 1100 may present a catalog 1110 and a network template area 1120 to a user. Catalog 1110 may include representations of network resources 140 provided in network 130. As shown, for example, catalog 1110 may include representations of a serving gateway (SGW), a packet data network (PDN) gateway (PGW), a policy and charging rules function (PCRF), etc. The user may create a virtual network template in network template area 1120 by selecting one or more representations of network resources 140 from catalog 1110 and moving the selected representations to network template area 1120. As shown, the user may have moved representations for an eNodeB (eNB), a mobility management entity (MME), the PGW, and a PDN from catalog 1110 to network template area 1120. The user may also move a representation of the SGW from catalog 1110 to network template area 1120. In one example, the user may attempt to build a virtual fourth generation (4G) wireless network template by moving the representations of network resources 140 to network template area 1120.

Figure 11B:
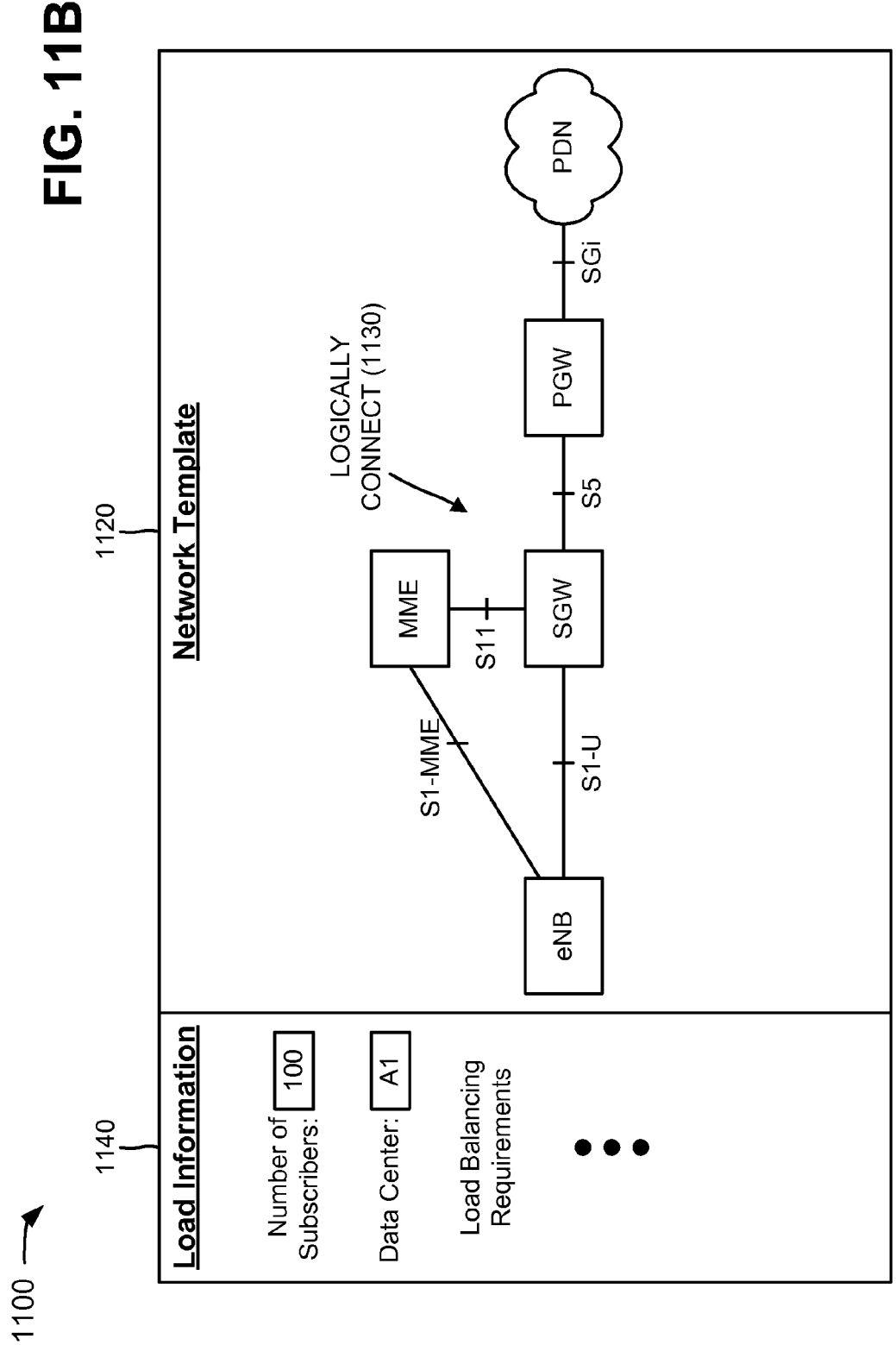

As shown in FIG. 11B, after the user is finished moving the representations of network resources 140 to network template area 1120, ECN device 120 may logically connect the representations of the selected network resources 140 to form a virtual 4G wireless network template, as indicated by reference number 1130. For example, the eNB representation may interface with the MME representation over a S1-MME interface, and may interface with the SGW representation over a S1-U interface. The MME representation may interface with the SGW representation over a S11 interface. The SGW representation may interface with the PGW representation over a S5 interface. The PGW representation may interface with the PDN representation over a SGi interface.

As further shown in FIG. 11B, user interface 1100 may include a load information section 1140 that enables the user to input information associated with network resources 140 represented in the virtual 4G wireless network template. For example, via load information section 1140, the user may input a number of flows and/or subscribers associated with the virtual 4G wireless network template; identifications of one or more data centers to deploy to implement the virtual 4G wireless network template; load balancing requirements for the virtual 4G wireless network template; etc.

Figure 11C:
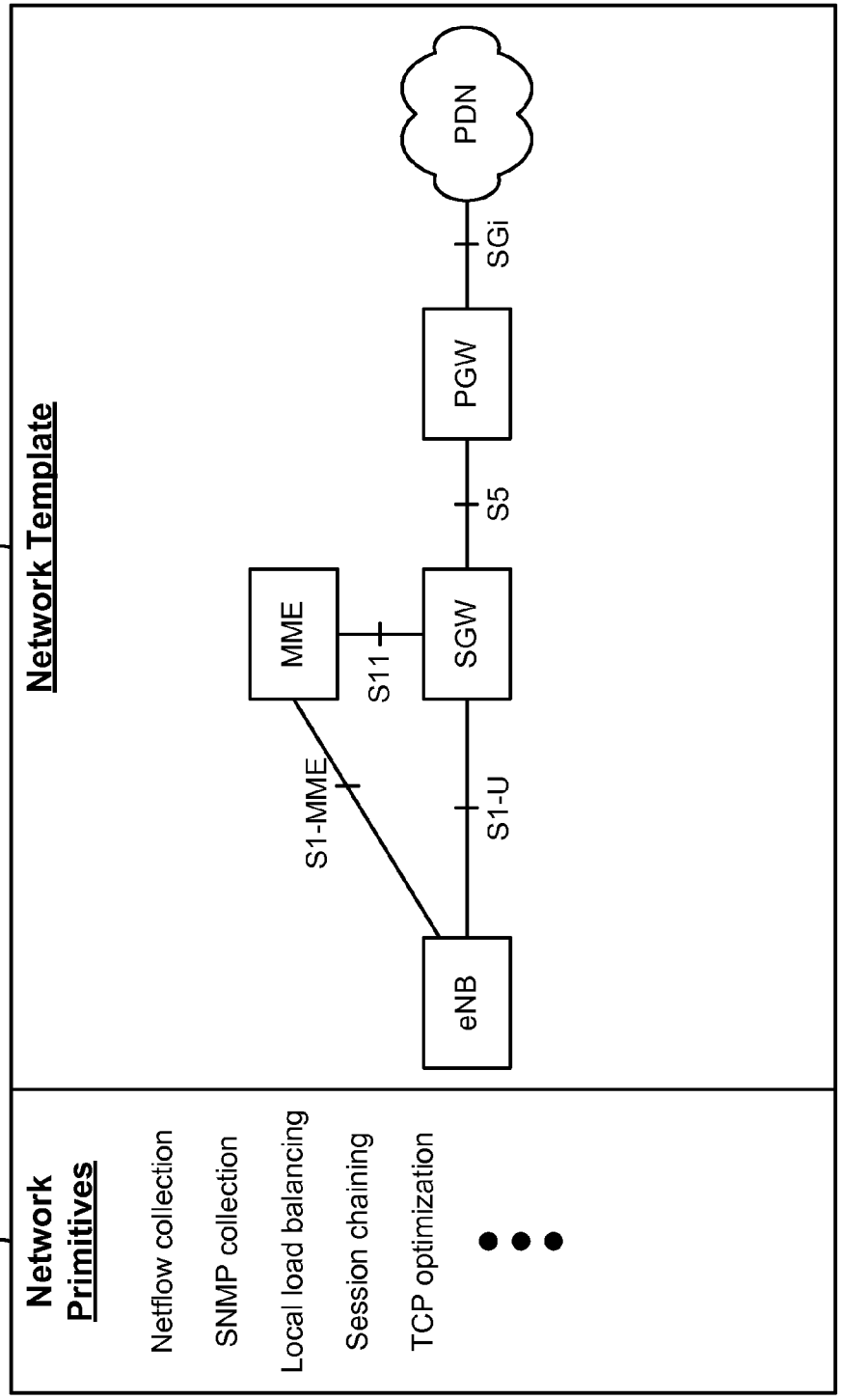

As shown in FIG. 11C, after the user is finished inputting information into load information section 1140, user interface 1100 may present a network primitives section 1150 to the user. Network primitives section 1150 may enable the user to input information associated with network primitives to deploy with the virtual 4G wireless network template. For example, via network primitives section 1150, the user may specify whether Netflow collection, SNMP collection, local load balancing, session chaining, TCP optimization, Syslog collection, etc. are desired for the virtual 4G wireless network template.

Figure 11D:
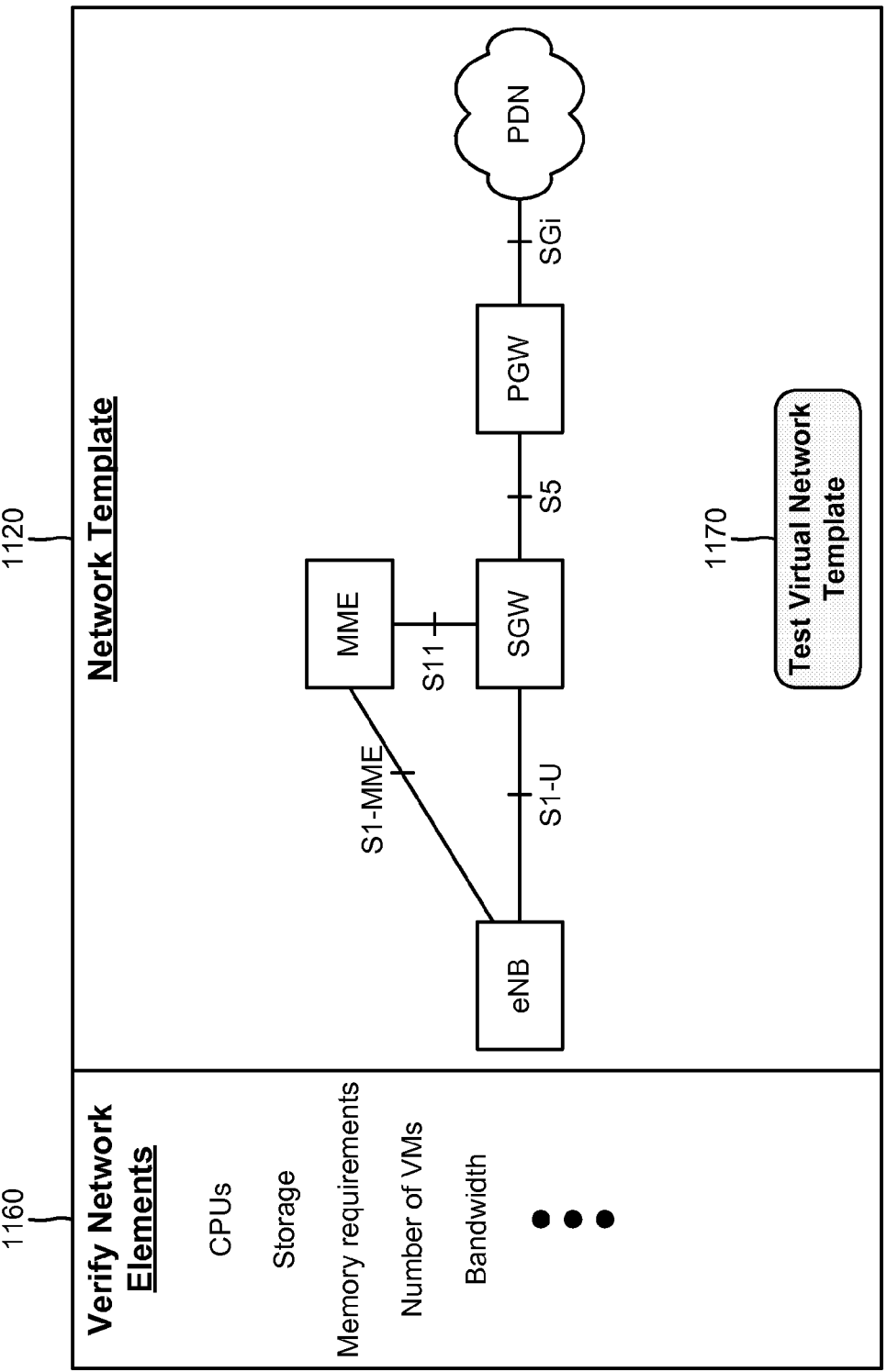

As shown in FIG. 11D, after the user specifies the network primitives via network primitives section 1150, user interface 1100 may present a verify network elements section 1160 to the user. Verify network elements section 1160 may enable the user to input information associated with network resources 140 represented in the virtual 4G wireless network template. For example, via verify network elements section 1160, the user may specify a number of processors (e.g., central processing units (CPUs)), storage requirements, and memory requirements for network resources 140 represented in the virtual 4G wireless network template; may specify a number of VMs associated with network resources 140 represented in the virtual 4G wireless network template; may specify a bandwidth associated with network resources 140 represented in the virtual 4G wireless network template; etc.

As further shown in FIG. 11D, after the user is finished inputting information into verify network elements section 1160, the user may select a mechanism 1170 (e.g., a button, an icon, a hyperlink, etc.) that instructs ECN device 120 to test the virtual 4G wireless network template in network resources 140 represented in the virtual 4G wireless network template. For example, if the user selects mechanism 1170, ECN 120 may deploy the virtual 4G wireless network template in network resources 140 for testing, and may test the deployment to determine whether the virtual 4G wireless network template functions are desired by the user.

Figure 11E:
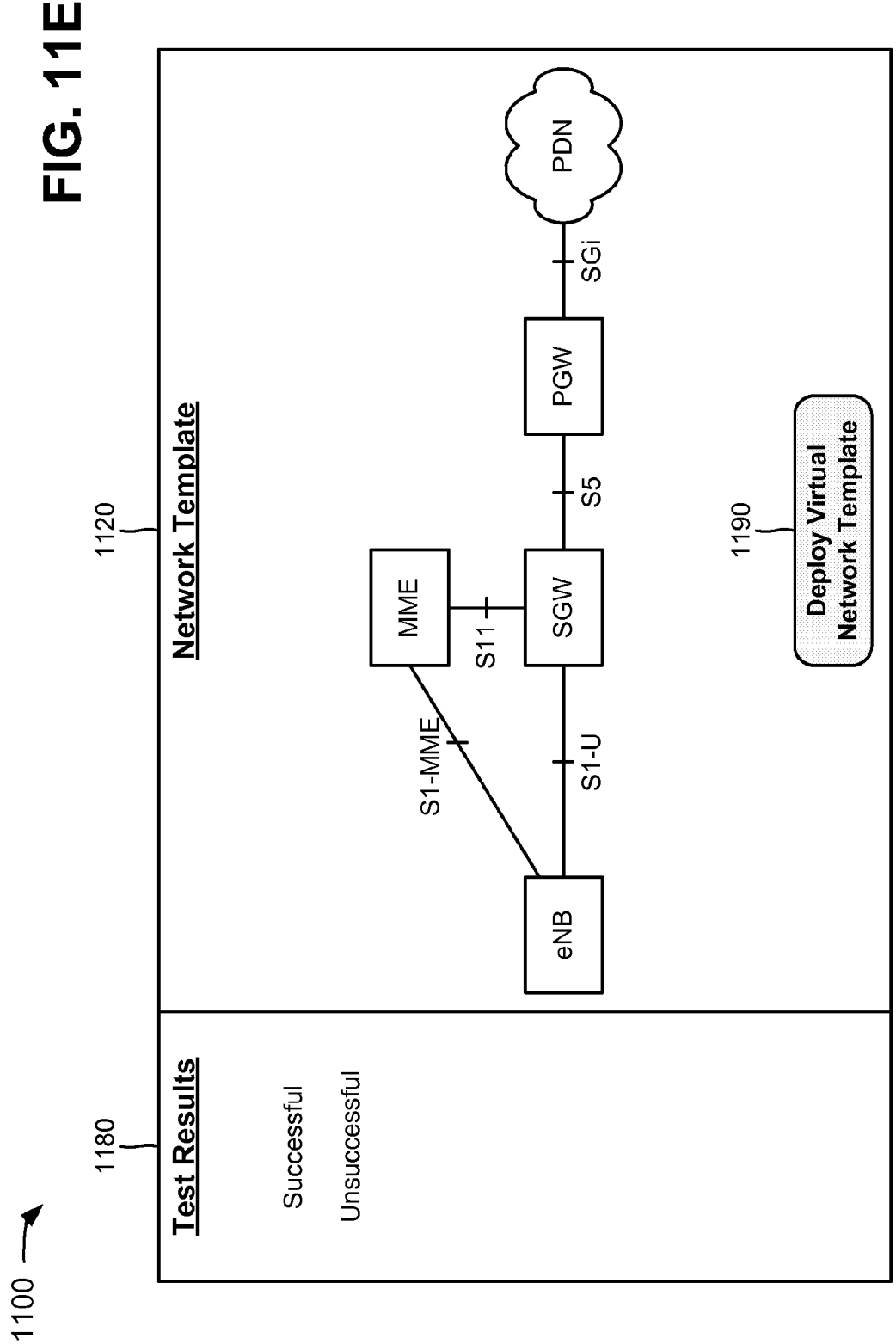

As shown in FIG. 11E, after testing the virtual 4G wireless network, user interface 1100 may present a test results section 1180 to the user. Test results section 1180 may provide numerical results of the test (e.g., flow rates, bandwidth usage, resource usage, etc.), an indication of whether the test was successful or unsuccessful, etc. If the test was successful, the user may select a mechanism 1190 (e.g., a button, an icon, a hyperlink, etc.) that instructs ECN device 120 to deploy the virtual 4G wireless network template in network resources 140 represented in the virtual 4G wireless network template. For example, if the user selects mechanism 1190, ECN 120 may deploy the virtual 4G wireless network template in network resources 140 for live use by subscribers of the 4G wireless network.

Although user interfaces 1100 of FIGS. 11A-11E depict a variety of information, in other implementations, user interfaces 1100 may depict less information, different information, differently arranged information, or additional information than depicted in FIGS. 11A-11E.

FIGS. 12-15 are flow charts of an example process 1200 for providing elastic cloud networking according to an implementation described herein. In one implementation, process 1200 may be performed by ECN device 120. Alternatively, or additionally, some or all of process 1200 may be performed by another device or group of devices, including or excluding ECN device 120.

As shown in FIG. 12, process 1200 may include receiving network infrastructure requirements from a user (block 1210), and determining network resource availability based on the network infrastructure requirements (block 1220). For example, in an implementation described above in connection with FIG. 3, a user of user device 110 may provide network requirements 310 to user device 110. Network requirements 310 may include information associated with a virtual network that the user wishes to implement, such as network resources 140 required for the virtual network, capabilities associated with network resources 140, interactions between network resources 140, network primitives to be used with the virtual network, etc. User device 110 may provide network requirements 310 to ECN device 120, and ECN device 120 may receive network requirements 310. ECN device 120 may determine availabilities associated with network resources 140 based on network requirements 310 in order to ensure that network 130 includes network resources 140 needed to employ the virtual network.

As further shown in FIG. 12, process 1200 may include recommending network resource(s) to the user based on the availability (block 1230), and receiving user-selected network resources based on the recommendations (block 1240). For example, in an implementation described above in connection with FIG. 3, based on the availabilities of network resources 140, ECN device 120 may provide recommendations 320 to user device 110. Recommendations 320 may include a list of recommended network resources 140 of network 130 to be used in the requested virtual network. User device 110 may receive recommendations 320, and the user may select, via user device 110, representations of one or more network resources 140 from the list of recommended network resources 140 provided in recommendations 320. The representations of the user-selected network resources 140 may be provided from user device 110 to ECN device 120 via one or more responses 330, and ECN device 120 may receive the representations of the user-selected network resources 140 via responses 330.

Returning to FIG. 12, process 1200 may include connecting the selected network resources to create a virtual network template (block 1250), and verifying requirements for the selected network resources (block 1260). For example, in an implementation described above in connection with FIG. 3, ECN device 120 may logically connect the representations of the user-selected network resources 140 to create a virtual network template, and may verify requirements (e.g., memory, processor usage, bandwidth, etc.) for the user-selected network resources 140. Verification of the requirements for the user-selected network resources 140 may ensure that the user-selected network resources 140 may handle the requirements of the virtual network template.

As further shown in FIG. 12, process 1200 may include testing the virtual network template (block 1270), and deploying the virtual network template via the selected network resources when the virtual network template is approved by the testing (block 1280). For example, in an implementation described above in connection with FIG. 3, ECN device 120 may test the virtual network template, as indicated by reference number 340, by testing the actual user-selected network resources 140 provided in network 130. The testing of the actual user-selected network resources 140 may generate test results 350 that may be provided to ECN device 120. Test results 350 may include, for example, operational statistics (e.g., bandwidth, connectivity, flow rates, etc.) associated with the testing, errors (e.g., overload conditions, memory issues, etc.) encountered during the testing, etc. If test results 350 indicate that the actual user-selected network resources 140 function as set forth in network requirements 310 (i.e., a success), ECN device 120 may deploy the virtual network template in network 130, as indicated by reference number 360. In one example, ECN device 120 may enable user device 110 to utilize the functionalities of the actual user-selected network resources 140, as set forth in network requirements 310.

Figure 13:
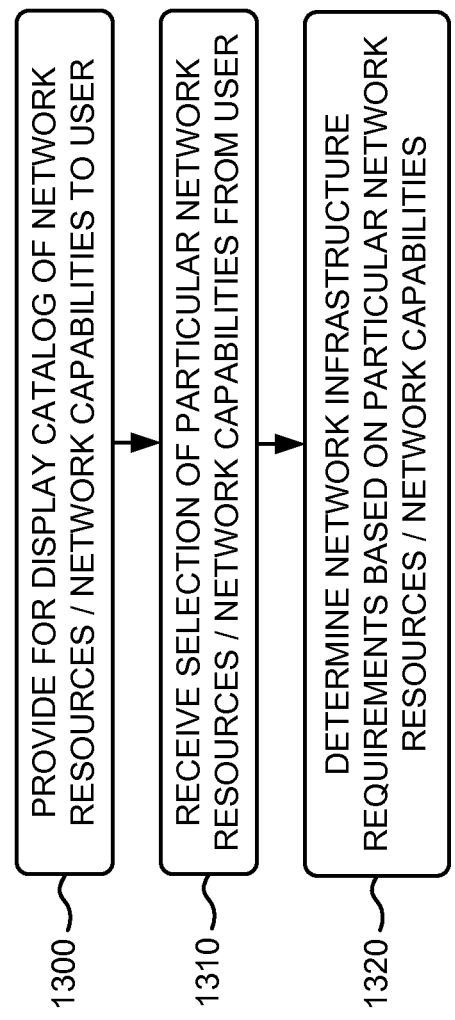

Process block 1210 may include the process blocks depicted in FIG. 13. As shown in FIG. 13, process block 1210 may include providing for display, to the user, a catalog of network resources/network capabilities (block 1300), receiving selection of particular network resources/network capabilities from the user (block 1310), and determining the network infrastructure requirements based on the particular network resources/network capabilities (block 1320). For example, in an implementation described above in connection with FIG. 11A, user interface 1100 may present catalog 1110 and network template area 1120 to a user. Catalog 1110 may include representations of network resources 140 provided in network 130. In one example, catalog 1110 may include representations of a SGW, a PGW, a PCRF, etc. The user may create a virtual network template in network template area 1120 by selecting one or more representations of network resources 140 from catalog 1110 and moving the selected representations to network template area 1120. ECN device 120 may determine network infrastructure requirements based on the virtual network template.

Figure 14:
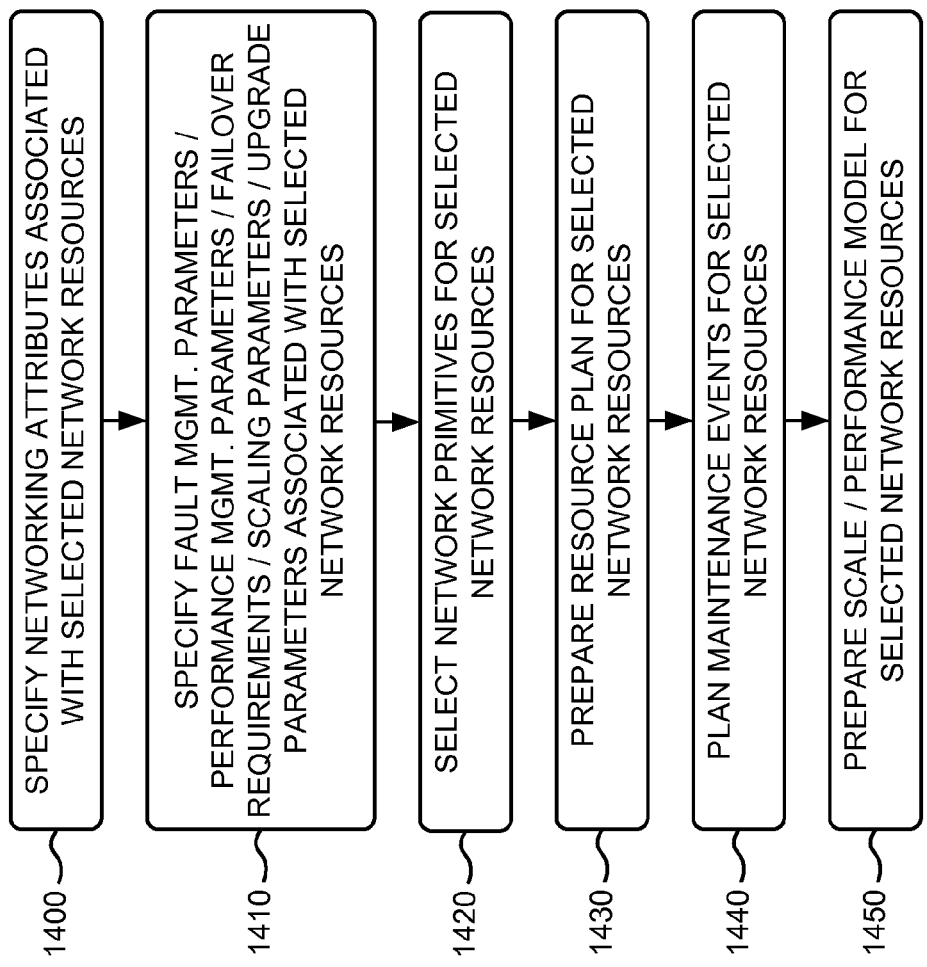

Process block 1260 may include the process blocks depicted in FIG. 14. As shown in FIG. 14, process block 1260 may include specifying network attributes associated with the selected network resources (block 1400) and specifying one or more of fault management parameters, performance management parameters, failover requirements, scaling parameters, and upgrade parameters associated with the selected network resources (block 1410). For example, in an implementation described above in connection with FIG. 7, attribute specifier 700 may enable a user to specify network attributes required to deploy network resources 140 in virtual networks. Parameter specifier 710 may enable a user to specify parameters associated with network resources 140 in virtual networks. In one example, the parameters may include fault management parameters; performance management parameters; sample rates associated with the fault management and performance management parameters; protocols (e.g., SNMP) associated with the fault management and performance management parameters; failover requirements; scaling parameters (e.g., maximum number of flows, maximum processor utilization, maximum memory utilization, scaling trigger points, maximum number of virtual instances per location, etc.); upgrade and downgrade information; etc. associated with network resources 140.

As further shown in FIG. 14, process block 1260 may include selecting network primitives for the selected network resources (block 1420), preparing a resource plan for the selected network resources (block 1430), planning maintenance events for the selected network resources (block 1440), and preparing a scale/performance model for the selected network resources (block 1450). For example, in an implementation described above in connection with FIG. 7, network primitive selector 720 may work with SDN component 400 to select and implement appropriate network primitives in concert with the implementation of network resources 140 of virtual networks. Resource plan creator 730 may prepare a resource plan that determines all required resources when a network resource 140 for a virtual network is established. In one example, the required resources may include a number of processors, memory, storage, transport information, security information, etc. associated with an established network resource 140 for a virtual network. Maintenance planner 740 may work with SDN component 400 to plan maintenance events for network resources 140 of virtual networks. Model creator 750 may prepare predictive analytics-based models that provide past, present, and/or future scale and performance information associated with virtual networks.

Process block 1280 may include the process blocks depicted in FIG. 15. As shown in FIG. 15, process block 1280 may include analyzing a state of attributes to operate the selected network resources (block 1500), performing a future state analysis of the attributes (block 1510), modifying security policies of the selected network resources so that the selected network resources can be instantiated (block 1520), and instantiating the selected network resources (block 1530). For example, in an implementation described above in connection with FIG. 6, attributes state analysis component 600 may analyze a current state of attributes associated with operation of network resources 140 of virtual networks. Future attributes state analysis component 610 may analyze a future (or predictive) state of attributes associated with operation of network resources 140 of virtual networks. Virtual network operation component 620 may implement network resources 140 of virtual networks, and may ensure that network resources 140 are operating properly. Security policy component 630 may modify security policies of particular network resources 140 (e.g., switches, firewalls, etc.) so that network resources 140 of virtual networks may be implemented in accordance with security policies.

As further shown in FIG. 15, process block 1280 may include performing load balancing for the selected network resources (block 1540), performing performance management collection, modeling, and tracking for the selected network resources (block 1550), providing a health check for the selected network resources (block 1560), and providing rate shaping requirements for the selected network resources (block 1570). For example, in an implementation described above in connection with FIG. 5, load balancing component 500 may perform load balancing services for network resources 140 provided in a virtual network. Performance management collector 520 may collect performance management information associated with network resources 140 provided in a virtual network. Performance modeling component 530 may provide performance modeling for network resources 140 provided in a virtual network. Health checking component 540 may perform health checking services for network resources 140 provided in a virtual network. Performance tracking component 550 may provide performance tracking services for network resources 140 provided in a virtual network. Rate shaping component 560 may perform rate shaping services for network resources 140 provided in a virtual network.

In one example implementation, ECN device 120 may be utilized in the following example use cases to create the virtual environments defined in the example use cases. Alternatively, or additionally, ECN device 120 may be utilized in other use cases not provided in the example use cases.

A first use case may include provisioning an IMS core network in a data center. The user of ECN device 120 may utilize user interfaces 1100 to select network resources from catalog 430. Topology manager 420 may import default attributes from catalog 430. Topology manager 420 may logically connect the network resources in a network, and may specify the number of flows/subscribers, a data center to be deployed, and load balancing requirements. Topology manager 420 may provision fault management and performance management elements, may specify network primitives (e.g., a SNMP collector, Syslog collector, and a Netflow collector), and may specify the number of flows per second for each network primitive. Topology manager 420 may set the AAA requirements to be used by the IMS core network, and may provision a CSCF, load balancers, and voice mail server IP Address for the IMS core network to use. Topology manager 420 may set all network resource specific attributes, and may verify requirements (e.g., CPUs, storage, memory requirements, number of VMs, etc.) for the network resources. Topology manager 420 may verify that the network resources are available in the specific data center, may set the attributes to provision the VMs, and may produce a formatted design document for the virtual network topology. Topology manager 420 may deploy the IMS core network into the data center for testing, may approve the test configuration for deployment, and may deploy the configuration to the production data center.

A second use case may include provisioning an EPC network in a data center. The user of ECN device 120 may utilize user interfaces 1100 to select network resources from catalog 430. Topology manager 420 may import default attributes from catalog 430. Topology manager 420 may logically connect the network resources in a network, and may specify the number of flows/subscribers, a data center to be deployed, and load balancing requirements. Topology manager 420 may provision fault management and performance management elements, may specify network primitives (e.g., a SNMP collector, Syslog collector, and a Netflow collector), and may specify the number of flows per second for each network primitive. Topology manager 420 may set the AAA requirements to be used by the EPC network, and may provision a MME, a SGW, a PGW, and a PCRF for the EPC network to use. Topology manager 420 may set all network resource specific attributes, may define failure domains for each EPC element, and may verify requirements (e.g., CPUs, storage, memory requirements, number of VMs, etc.) for the network resources. Topology manager 420 may verify that the network resources are available in the specific data center, may set the attributes to provision the VMs, and may produce a formatted design document for the virtual network topology. Topology manager 420 may deploy the EPC network into the data center for testing, may approve the test configuration for deployment, and may deploy the configuration to the production data center.

A third use case may include provisioning fault management and performance management collectors in a data center. The user of ECN device 120 may utilize user interfaces 1100 to select network resources from catalog 430. Topology manager 420 may import default attributes from catalog 430. Topology manager 420 may logically connect the network resources in a network, and may specify the number of flows/subscribers, a data center to be deployed, and load balancing requirements. Topology manager 420 may provision the fault management and the performance management collectors, may specify network primitives (e.g., a SNMP collector, Syslog collector, and a Netflow collector), and may specify the number of flows per second for each network primitive. Topology manager 420 may set all network resource specific attributes, and may verify requirements (e.g., CPUs, storage, memory requirements, number of VMs, etc.) for the network resources. Topology manager 420 may verify that the network resources are available in the specific data center, may set the attributes to provision the VMs, and may produce a formatted design document for the virtual network topology. Topology manager 420 may deploy the fault management and the performance management collectors into the data center for testing, may approve the test configuration for deployment, and may deploy the configuration to the production data center.

A fourth use case may include provisioning a collector in a data center. The user of ECN device 120 may utilize user interfaces 1100 to select a collector (e.g., a SNMP collector, a Netflow collector, a Syslog collector, etc.) from catalog 430. Topology manager 420 may deploy the collector in the data center, may set a duration for which the collected data shall be stored, and may set a number of flows per second to be collected by the collector. Topology manager 420 may calculate a number of VMs needed to support the requirements of the collector, and may determine the CPUs, storage, and memory required to host the VMs of the collector. Topology manager 420 may alert the user if there are insufficient resources available to deploy the collector, and may provision the data center to support the collector VMs.

A fifth use case may include provisioning an EPC element in a data center. The user of ECN device 120 may utilize user interfaces 1100 to select the EPC element (e.g., a MME, a SGW, a PGW, a PCRF, etc.) from catalog 430. Topology manager 420 may select the data center for deployment of the EPC element, and may set a number of flows per second to be supported by the EPC element. Topology manager 420 may calculate a number of VMs needed to support the requirements of the EPC element, and may determine the CPUs, storage, and memory required to host the VMs of the EPC element. Topology manager 420 may alert the user if there are insufficient resources available to deploy the EPC element, and may provision the data center to support the EPC element VMs.

A sixth use case may include providing utilization modeling for virtual networks. Topology manger 420 may communicate with network hypervisor 410 to ascertain CPU utilization, memory utilization, storage utilization, Netflow collection, Syslog collector, and other data sources to determine the performance of each virtual network. Topology managers 420 may generate dashboard reports, at a particular time (e.g., daily), that show the utilization of the virtual networks. The dashboard reports may include information such as, a time of day, a day of the week, monthly, holiday peak, region, data center, etc. information associated with the utilization of the virtual networks. The dashboard reports may be accessible via a web browser, may be prepared for each virtual network deployed, and may include data refreshed after a particular time (e.g., every fifteen minutes).

A seventh use case may include providing topology recalculation. Topology manager 420 may provide, to the user, a recommendation screen that suggests an optimized topology based on data analysis. If a recommendation is approved by the user, topology manager 420 may implement the changes associated with the recommendation. Upon execution of the changes, topology manager 420 may add or remove appropriate licenses to or from catalog 430 based on the changes. In one example, topology manager 420 may provide a recommendation that suggests an optimized topology based on the data analysis. If the recommendation is approved by the user, topology manager 420 may implement the optimized topology, and may changes the appropriate licenses.

An eighth use case may include providing local load balancing. A user may instantiate load balancers for virtual networks using topology manager 420. The user may use topology manager 420 to set a unique name for each load balancer, and to select a protocol (e.g., SIP, HTTP, TCP, etc.) to balance. For each load balance, the user may also use topology manager 420 to select a balancing algorithm, set a number of VIPs, set a number of virtual load balancer instances, set a maximum number of connections per load balancer, assign IP addresses to the load balancer, and configure health check logic to the VMs.

A ninth use case may include creating a customer overwatch dashboard. A user may log into topology manager 420 may select a topology for which the user wishes to create a dashboard. The user, via topology manager 420, may check an "Enable Overwatch" checkbox, may launch the overwatch, and may set attributes to monitor for the topology.

A tenth use case may include viewing the overwatch dashboard. A user may log into topology manager 420 may select a topology (e.g., an "Overwatch" topology) for which the user wishes to view a dashboard. Upon selection of the topology, topology manager 420 may retrieve the overwatch dashboard, and may provide the overwatch dashboard for display to the user. The user may manipulate the overwatch dashboard accordingly.

An eleventh use case may include specifying a dashboard upon instantiation. Topology manager 420 may support a real-time application programming interface (API) that enables a user to select a topology to view. In one example, the user may select "View Performance Data" from the API, and topology manager 420 may retrieve a dashboard for the selected topology and may display the dashboard. The dashboard may include a high level overview, and the user may interact with the dashboard to view data collected since the instantiation of the topology.

A twelfth use case may include providing geographic diversity. Topology manager 420 may establish a topology that requires geographic diversity, such as configure global load balancing requirements for a SDN. The user may utilize topology manager 420 to define the geographic regions to be being balanced, configure failover trigger(s), and define network proximity for a global load balancer. Topology manager 420 may verify that a load is being balanced between two locations. If one location fails, topology manager 420 may remove a failing location from a balancing pool, may ensure that fault management/performance management systems record data related to the failure, and may display the failure to the user.

A thirteenth use case may include providing a policy agent for network hypervisor 410. Topology manager 420 may install a policy agent on network hypervisor 410 to ensure that virtual networks comply with corporate policies. In one example, the policy agent may set enforcement parameters based on an identity of a requestor, a nature of a workload, a capacity of different elements in the virtual networks, applicable compliance policies, required service levels, organization-specific policies, etc. The policy agent may enforce, for example, patches, ports, virus software, malware software, etc.

A fourteenth use case may include configuring a policy agent. A user, via topology manager 420, may select the policy agent and may be able to author policies and save them in a group. In one example, the policy agent may include preconfigured policies, such a Sarbanes-Oxley, HIPAA, DISA, ISO 27002, 802-53 and Basel II, PCI DSS, NIST, etc. The policy agent may enforce, for example, kernel version of guest OS, patches implemented, antivirus software, anti-malware software, etc.

A fifteenth use case may include detecting a VM failure. ECN device 120 may detect VM failures that generate one or more alarms. Topology manager 420 may indicate, to the user, that a topology is in alarm. When a VM failure is detected, topology manager 420 may rebalance a load of a failing VM to another VM.

A sixteenth use case may include recovering from a VM failure. When a VM fails, topology manager 420 may detected the failure and may restore the failed VM. In one example, topology manager 420 may restart the failed VM, may ensure all agents are enabled, may restore an OS, may restore an application, and may verify that the application is running.

A seventeenth use case may include deploying a virtual network infrastructure in a remote data center. Via topology manager 420, a user may select a data center to deploy the virtual network elements. Topology manager 420 may utilize an API of the data center to determine which servers are available for use. Topology manager 420 may create a new server, may set a memory allocation for the server, may add storage disks, and may install a VM, an OS, and an application. Topology manager 420 may configure a load balancer in the data center, may configure port mapping on data center switches, and may add Internet access to the configuration.

An eighteenth use case may include removing a virtual network infrastructure in a remote data center. Via topology manager 420, a user may select a data center from which to remove virtual network elements. Topology manager 420 may utilize an API of the data center to determine which servers are available for use, to select a server, to delete the server, to shut down ports, and to disable Internet service to the server.

A nineteenth use case may include recovering from an application failure. Topology manager 420 may identify the failure, and may display topology conditions associated with the application failure, such as flows impacted, changes in HA state, sessions impacted, hardware state, state of connectivity to a host server, etc. Via topology manager 420, the user may identify the components of the topology that failed and resulted in to the application failure, such as connectivity, a load balancer, a SDN, a server, a VM, an application, etc. If the server is reachable from topology manager 420, the VM can be serviced by removing the application, restarting the application, and/or re-installing the application. If the VM is operating properly, the application may be removed, restarted, and/or re-installed.

A twentieth use case may include troubleshooting. For example, via topology manager 420, a user may perform the following troubleshooting: ping an endpoint, SSH to an endpoint, send a HTTP GET request to an endpoint, send a TRACERT message to an endpoint, login to a network element, etc.

A twenty-first use may include cost tracking. For example, topology manager 420 may represent a cost of deploying a topology. The cost may increase or decrease based on a number of applications, VMs, compute and storage resources, etc. utilized by the topology. The cost may include costs of support systems prorated across a number of active devices in the topology.

A twenty-second use case may include providing a software update. Using topology manager 420, a user may select a topology to upgrade, and may select a virtual network element of the topology. Topology manager 420 may instruct a SDN to stop sending traffic to the virtual network element, and may remove the virtual network element from service. Topology manager 420 may upgrade the software for the virtual network element, may start the software, may test the software, and may instruct the SDN to balance traffic to the virtual network element.

A twenty-third use case may include providing a software downgrade. Using topology manager 420, a user may select a topology to downgrade, and may select a virtual network element of the topology. Topology manager 420 may instruct a SDN to stop sending traffic to the virtual network element, and may remove the virtual network element from service. Topology manager 420 may downgrade the software for the virtual network element, may start the software, may test the software, and may instruct the SDN to balance traffic to the virtual network element.

A twenty-fourth use case may include cost tracking. For example, topology manager 420 may track a cost for each network resource 140 provided in a virtual network in order to track the cost of deployment of the virtual network. When a topology is established, topology manager 420 may add the cost of all network resources 140 used to establish the topology, and may display the costs in a variety of formats (e.g., cost per hour, cost per gigabyte, cost per session, etc.).

A twenty-fifth use case may include DNS scaling. For example, topology manager 420 may calculate DNS queries per second that are required when a topology is created.

A twenty-sixth use case may include providing IP version 6 (IPv6) transport. For example, topology manager 420 may communicate with other components of ECN device 120 using IPv6 transport.

A twenty-seventh use case may include maintaining NAPTR records. For example, topology manager 420 may coordinate NAPTR records needed to operate an EPC network, and may receive the NAPTR records in a particular format (e.g., an Excel file format).

A twenty-eighth use case may include configuration management. For example, topology manager 420 may automatically transmit a configuration of a previously created topology to a new topology if the configuration is designated as an expansion to another topology.

A twenty-ninth use case may include providing a process for releasing an ECN topology into production. Topology manager 420 may be designed to ensure that a topology is tested and approved before the topology can be instantiated into a production network. Topology manager may be used to define the topology to include network elements, SDN settings, firewall requirements, DNS requirements, SLA settings, maximum concurrent flows, maximum concurrent sessions, maximum flows per second, maximum sessions per second, etc. Upon creation of the topology, topology manager 420 may release the topology for testing and may determine that the topology can be instantiated in a test lab. Topology manager 420 may instantiate the topology in the lab, and the lab may execute the required testing. Upon completion of the testing, a user, via topology manager 420, may mark the topology as "Testing Complete," and the topology can be released to a First Office Application (FOA). The user, via topology manager 420, may deploy the topology into the production network, and may select a data center where the topology is deployed. Topology manager may verify that there are sufficient resources in the data center to support the topology, and may instantiate the topology in the data center. The topology may be tested in accordance with a FOA Test Plan. Upon completion of the testing and the appropriate FOA activities, topology manager 420 may mark the topology as Generally Available (GA).

A thirtieth use case may include providing failure domains. For example, topology manager 410 may support a definition of a failure domain, which may permit a user to describe how systems will fail between one another. Topology manager 420 may create a topology, and may define a backup topology or may select an existing system(s) as a backup. Topology manager 420 may calculate a failover load required to use the topology as a failover, and may recommend changes in the topology to meet needs of the architecture. Once approved, topology manager 420 may provision the SDN to establish health checks and actions to take in the event of failure.

A thirty-first use case may include hosting costs. For example, when a topology is created, a cost of hosting equipment and minor materials may be provisionable in topology manager 420. Topology manager 420 may record this cost information and may use the cost information in financial analyses.

A thirty-second use case may include providing failure domains. When a topology is established, topology manager 420 may allow a user to specify failure domains for each network element in the topology. The failure domains may be at the application, VM, CPU, server, data center, regional, etc. levels. The user, via topology manager 420, may define a virtual architecture where virtual network systems are deployed. The architecture may define a number of flows, sessions, and parameters to be met by the solution. The architecture may include support systems, such as DNS servers, DHCP servers, firewalls, intrusion protection systems, analytics collection, etc. Topology manager 420 may match a number of VMs to the architecture based on key performance indicators (KPIs) pulled from catalog 430. The architecture may include load balancing functions needed to operate the architecture, such as local load balancing, global load balancing, etc. The failover of applications may be defined by the user within topology manager 420, and may include local failover, geographic redundancy, etc. Topology manager 420 may evaluate the failure domain to determine a number of VMs and locations for which the VMs should be instantiated. The location and quantity of the VMs per location may based on reliability metrics defined in the topology, such as a number of VMs per server, a number of VMs per cabinet, a number of VMs per data center, etc. If the applications within the failure domain require stateful failover, topology manager 420 may be responsible for instructing the applications that they shall share state information. Topology manager 420 may calculate and provision the bandwidth required to share the state between the applications. Topology manager 420 may instantiate the applications and may push attributes (e.g., load balancing requirements, application health check parameters, failure actions, etc.) to SDN component 400. If a failure occurs, topology manager 420 may be alerted to the event. When a failed server is restored, or additional server capacity is made available, topology manager 420 may deploy a new VM and/or application. Topology manager 420 may push the configuration to a current application that the new application is its new "mate." The applications may share state information with one another, and topology manager 420 may instruct SDN component 400 to load traffic to the array of applications within the failure domain as described within the load balancing definition.

A thirty-third use case may include providing for failed hardware. Topology manager 420 may prepare reports, for each data center, that identify failed components, and may present the reports on a tablet to simplify operations. When a component (e.g., a server, a drive, etc.) is replaced, topology manager 420 may update the status on the tablet within ten minutes.

A thirty-fourth use case may include recalculation of a topology. Topology manager 420 may allow for financial aspects of a design to be considered for implementation of a topology. When a topology is calculated and prepared for deployment, a cost of the topology may be displayed. The costs may be compared to similar topologies (e.g., via a side-by-side comparison). If a cost metric is changed (e.g., reduced transport costs), topology manager 420 may recalculate the topology.

A thirty-fifth use case may include SIP load balancing. For example, SDN component 400 may support local load balancing of SIP signaling traffic. SDN component 400 may provision IP Addresses for SBC resources in a local pool, and may provision the load balancing for the SBCs. SDN component 400 may set a health check interval, may set a health check protocol, may set SNMP reporting attributes, and may set SIPFix reporting attributes.

A thirty-sixth use case may include HTTP load balancing. For example, SDN component 400 may support local load balancing of HTTP traffic, and may provision IP addresses for all HTTP resources in a local pool. SDN component 400 may provision load balancing for servers, may set a health check interval, may set a health check protocol, may set SNMP reporting attributes, and may set SIPFix reporting attributes.

A thirty-seventh use case may include providing SDN software on a server. For example, a user, via topology manager 420, may provide the SDN software on servers. Topology manager 420 may calculate the SDN resources required, may install the SDN software, may verify patches and versions are installed, and may execute the SDN software.

A thirty-eighth use case may include providing SDN software on VMs. For example, a user, via topology manager 420, may provide the SDN software on VMs. Topology manager 420 may calculate the SDN resources required, may install the SDN software, may verify patches and versions are installed, and may execute the SDN software.

A thirty-ninth use case may include preventing hung sessions from IMS. For example, when a user equipment (UE) hangs up, SDN component 400 may track SIP END commands, may verify that a connection has been terminated at SBCs, and may clear flow states at the IMS core.

A fortieth use case may include preventing hung sessions between data centers. For example, upon termination of a flow between data centers, SDN component 400 may track TCP and UDP flows to and from data center servers, and may close subsequent flow states across the data path.

A forty-first use case may include providing for stateful failover. For example, a SDN instance fails, flows carried by a card, a server, or a VM may fail without losing traffic.

A forty-second use case may include providing for flow tracking. For example, SDN component 400 may support mirroring of traffic to WireShark on a management client, mirroring of traffic on a physical Ethernet port whereby traffic will be mirrored for both transmit and receive simultaneously. Traffic may also be mirrored as it appears outside of SDN component (i.e., after manipulations for transmitted traffic, and before manipulations for received traffic).

In a forty-third use case, SDN component 400 may be provisionable via HTTP REST, CLI, and/or XML.

A forty-fourth use case may include providing for SNMP. For example, SDN component 400 may be able to alarm up to ten trap destinations of a North Bound Interface (NBI) using an SNMPv3 interface. The following alarm parameters may be present in the SNMPv3 Management Information Base (MIB): server, NIC, and port status change; steering element status change; grid server status change; grid and management server hardware status change; port status change; steering element or endpoint status change; etc.

A forty-fifth use case may include providing for Syslog. For example, SDN component 400 may be capable of generating Syslog messages for the following parameters: grid and management server hardware status change; port status change; steering element or endpoint status change; etc.

A forty-sixth use case may include providing TCP optimization. For example, SDN component 400 may be able to specifically set TCP MTU sizes for RAN traffic. In order to verify that a specific MTU size is being set, a SDG may be provisioned with a set MTU size. A test set may be connected to SDG EBN interfaces, emulating subscriber traffic profiles and ensuring that the TCP MTU size specified is the actual MTU size seen by the test set.

A forty-seventh use case may include providing TCP optimization. For example, SDN component 400 may be able to adjust a TCP congestion window size in order to increase throughput in high latency RANs. To verify the functionality, SDN component 400 may transmit TCP traffic from a web server with a maximum window size, and may set RAN latency. Without TCP optimization enabled, throughput may be limited, and with the TCP optimization enabled, throughput may be increased to a maximum available throughput of the RAN.

A forty-eighth use case may include providing TCP optimization. For example, SDN component 400 may be capable of throttling individual TCP connections when latency increases due to congestion. In order to verify that a SDG is capable of throttling TCP connections exhibiting increased latency, a test set may be connected to SDG EBN interfaces emulating subscriber traffic profiles.

A forty-ninth use case may include providing for new flow instantiation. For example, each SDN component 400 may be capable of handling no less than a particular amount of new flows per second.

A fiftieth use case may include providing for concurrent flows per SDN component 400. For example, each SDN component 400 may be capable of handling no less than a particular amount of concurrent flows per second.

A fifty-first use case may include providing a particular bandwidth per SDN component 400. For example, each SDN component 400 may be capable of processing at a maximum rate of NIC(s) on a Server for which a VM is installed.

A fifty-second use case may include providing failover surge capacity. For example, topology manager 420 may provision SDN component 400 to support a failover surge of an entire virtual topology.

A fifty-third use case may include providing long-term capacity. For example, SDN component 400 may maintain throughput for flows lasting at least five hours for no less than 72 hours, and may maintain a maximum throughput for flows lasting no more than five minutes for no less than 72 hours.

A fifty-fourth use case may include providing for a Gx interface. For example, SDN component 400 may support a Gx Interface from a PCRF.

A fifty-fifth use case may include providing virtual IP addresses. For example, SDN component 400 may manage virtual IP addressing for a network such that when a topology is expanded, there may be no change required in DNS tables. SDN component may calculate a round-trip delay to ascertain a best location for a specific application based on an optimization of the application, and may pass RTT times to topology manager 420 for assessment.

A fifty-sixth use case may include providing for local DNS services. For example, local DNS services may be provided by a DNS proxy executing on a VM. Topology manager 420 may determine if services being instantiated require a DNS service in the configuration. Topology manager 420 may ensure that DNS servers are established in pairs, and may set attributes required to operate the DNS Server for the services by creating a file and saving the file to an appropriate directory.

A fifty-seventh use case may include providing dynamic DNS (DDNS) services. For example, dynamic DNS may be supported by virtual DNS servers, and may be used by a vIMS core to update a URL for subscribers. The DNS Server may support dynamic address updates via IPv6, may support AAAA queries from the IMS infrastructure, and may support NAPTR records.

A fifty-seventh use case may include providing predictive modeling. ECN device 120 may continually assess optimal utilization of network elements, and may apply predictive analytics techniques to determine an optimal number of VMs and host-related resources for each network element. ECN device 120 may prepare reports for a particular number of days in the future. Long-term day models may permit a growth multiplier to be applied by the user to include future growth that may not be reflected by growth trends. Dashboards with long-term forecasts may show both current trends and a trend created with the growth multiplier.

A fifty-eighth use case may include integrating performance data. For example, topology manager 420 may support a real-time API from which a user may select a topology to view data against. When the user selects "View Performance Data," topology manager 420 may retrieve a dashboard for that topology. ECN device 120 may transfer the dashboard for the topology to topology manager 420, and the dashboard may be displayed within topology manager 420 GUI. The dashboard may provide a highest level overview, and the user may interact with the dashboard to view all aspects of the data collected since the instantiation of the topology.

A fifty-ninth use case may include providing an oversight dashboard. ECN device 120 may continually assess optimal utilization of the network elements, and may provide dashboards representing each virtual topology. ECN device 120 may collect data at particular time intervals, and may collect data from any virtual network element in the topology. The collected data may provide insight into resource utilization, operational performance, and overall demand patterns (e.g., a number of VMs, a role of each VM, changes in the number of VMs over time, CPU failures, failed health checks, locations of VMs, CPU utilization, latency, transaction volumes, error rates, disk reads and writes, network traffic, etc.). Raw data may be stored for 30 days, and aggregated data may be stored for one year. Threshold alarms may be set for any parameter that is being monitored, and alarms may be provided via an email alert, SNMP trap, an automated action, etc.

A sixtieth use case may include providing for VoIP records. ECN device 120 may collect SIPFix records for all VoIP calls placed to and from a vIMS core, and may display a dashboard that shows called and calling parties, a call flow, and states of steps in the call. The dashboard may include a date and time for calls, and may permit a user to filter reports by MDN, vIMS core, vSBC, region, area, data center, etc. Trend analysis may be automatically executed to identify slips in a SLA or changes in trends that may identify faults.

A sixty-first use case may include providing data collection at network hypervisor 410. For example, upon instantiation of a topology, topology manager 420 may use an API to install an analytics agent on network hypervisor 410. The analytics agent may collect SNMP, SIPFix, NEtflow, Syslog, etc. information directly from an OS socket to network hypervisor 410, and may move data to an adjunct processor. The adjunct processor may transfer data to a core data repository.

A sixty-second use case may include transferring SLA requirements to an analytics subsystem (of ECN device 120) to prepare a dashboard. For example, when a topology is established, SLAs may be defined. When the SLAs are set, topology manager 420 may send parameters to the analytics subsystem, and the analytics subsystem may set SLA parameters for the specific topology so that the dashboards reflect status with regard to the set SLAs. ECN device 120 may present a dashboard specifically set for the topology with the associated SLAs.

A sixty-third use case may include modifying SLAs. For example, from topology manager 420, SLAs for a specific topology may be modified. Upon modification, the SLAs may be sent to the analytics subsystem, and the analytics subsystem may set SLA parameters for the specific topology so that the dashboards reflect status with regard to the SLAs. ECN device 120 may present a dashboard specifically set for the topology with the associated SLAs.

A sixty-fourth use case may include providing for SLA alerting. For example, when a SLA threshold is crossed, ECN device 120 may alert a user, may send a SNMP trap, may highlight the event on a dashboard, and may ensure that topology manager 420 indicates that the SLA event has occurred.

A sixty-fifth use case may include handling a failure of a collector within a VM. For example, ECN device 120 may perform health checks of virtual collectors. When a health check fails, ECN device 120 may send a SNMP Trap, and the failed collector may automatically restart a process. If the restart process fails, ECN device 120 may send a SNMP trap, and topology manager 420 may provide an alert indicating that the collector within a VM has failed.

A sixty-sixth use case may include computing network cost based on time of day. For example, ECN device 120 may model behaviors of devices to identify a time of day when devices are not on a network. ECN device 120 may permit a user to insert a number of devices, a length of connection, a bandwidth required, a frequency of connection, etc. ECN device 120 may calculate, based on present loading characteristics of the network, when subscribers should connect and how much that would cost. ECN device 120 may permit the user to insert the above variables and specify a time for which the devices would connect, and may prepare a resulting cost model based on the request.

A sixty-seventh use case may include using analytics to determine a scaling ECN. For example, when an ECN architecture is created, ECN device 120 may enable the architecture to scale using automated processes. When a virtual network is defined, SLAs and scaling metrics for each component of the network may be defined in topology manager 420. Trigger points for scaling each element in the topology may be defined when the topology is designed. The virtual network may include a number of virtual network elements and specific configurations that are defined to create a topology. Topology manager 420 may instantiate the virtual network by determining the number of VMs required to operate the virtual network. Each VM may include a data collection agent that collects standard networking data, such as SNMP, SIPFix, IPFix, Netflow, etc.; and collects data from host computers, including disk reads and wWrites, CPU utilization, number of VMs on the machine, etc. The data collection agent may aggregate the data, and may streams the data to a core data collections system. The core data collection system may collect data from all data sources and may coalesce the data for each deployed topology. Topology manager evaluate a state of the deployed topologies, and may evaluate the data against the SLAs and scaling parameters to determine if the virtual elements in the topology need to be scaled up or down. Topology manager 420 may recalculate the scale of each topology, and may leave the topology unchanged, may recommend a resize event for the topology, or may automatically change the topology to satisfy a new sizing calculation. Upon execution of this action, the changes to the topology may be transferred to an analytics engine.

A sixty-eighth use case may include providing financial modeling. ECN device 120 may collect a cost of virtual network elements in a topology. The cost of each virtual network element may be provided when the element is loaded into catalog 430. When a network element is placed in production, the cost of the element may be exported to an analytics engine. The cost of virtual network elements may be based on country, state, region, area, site, topology, cost per unit of service (e.g., cost per flow, cost per session, cost per DNS query, etc.), etc. Financial dashboards may be provided and may include a cost for forecasted growth, a cost if elastic models are applied, a cost per data center, etc.

A sixty-ninth use case may include providing a network intelligence center (NIC). For example, analytics may include a single point of entry from which they can be accessed. A role based sign-on may be used to define what reports are visible to each user, and a user profile may include all reports for that user. The user may select the reports they wish to have in the NIC from a list of all available reports, and may add or remove reports from the NIC. From a NIC start page, the user may move from report to report, and the NIC may automatically logout after a particular idle time.

A seventieth use case may include providing peak load predictions. For example, ECN device 120 may review databases to determine likely times when a network will experience peak demand. ECN device may correlate the data with current data trends to validate and/or remodel a topology, and may provide this information to topology manager 420. Topology manager 420 may recommend or implement changes to address changes in network resources.

A seventy-first use case may include providing cumulative reliability. For example, for each topology, ECN device 120 may perform a cumulative design reliability study, and may record a failure for each element in the topology, such as a VM failure, a transport failure, a hardware failure, a software failure, etc.

In a seventy-second use case, ECN device 120 may virtualize a HSS to support instantiation with each topology. ECN device 120 may automatically replicate HSS data over multiple servers, and may automatically partition the HSS data so that each server contains a subset of the total data. A HSS server failure may be handled transparently by multiple virtual HSSs being represented by a single VIP. HSS data may be versioned to maximize data integrity in failure scenarios without compromising availability of the system. Each virtual HSS may be independent of other nodes with no central point of failure or coordination. ECN device 120 may provide pluggable data placement strategies to support distribution across data centers that are geographically far apart. Each virtual HSS may support ten to twenty thousand operations per second. The virtual HSS may be modeled to operate in ECN compute elements, and the model may specify a number of ECN compute elements, transport, disk space, data replication factors, etc. per virtual HSS. The virtual HSS may be upgradable or downgradable, from topology manager 420, with no traffic loss. The virtual HSS may support on-boarding of up to ten million devices in a single batch.

A seventy-third use case may include creating elements in catalog 430. For example, from a catalog menu, a user may select create new network element, may enter a server address (URL) for a master license server, or may create a network element from scratch (e.g., VM, OS, provisional attributes, license server address, etc.). An icon may be imported from the master license server, and if an icon is not imported, a generic icon may be selected to represent the network element. ECN device 120 may import default attributes of the network element from the master license server, and may provide them to catalog 430. A user may edit the attributes for each network element, may query the master license server to present the number of licenses purchased and available, and may verify that the network element is imported and all attributes are set.

A seventy-third use case may include passing virtual network attributes from catalog 430 to topology manager 420.

The virtual network elements in catalog 430 may include attributes for a network element, such as a name, a license cost, a number of licenses in use, a number of licenses remaining, sessions per VM, flows per VM, a number of ECN compute elements required to operate, configurable attributes needed to be instantiated, etc.

A seventy-fourth use case may include verifying a number of used licenses and available licenses. For example, catalog 430 may query a license server to determine a number of licenses available, and may query topology manager 420 to validate a number the number of licenses deployed. Topology manager 420 may display the number of licenses in use and available on an icon to indicate availability.

A seventy-fifth use case may include setting SLA requirements for the network elements in catalog 430. For example, when a virtual network element is imported into catalog 430 a user may set the SLA requirements for the network element. The user may log-in, select an icon representing the network element, select set SLA from a context menu, and save the SLA settings.

A seventy-sixth use case may include determining resource costs. For example, when a network resource is added to catalog 430, one of the attributes may include cost per instance. The network resources may include ECN compute resources in addition to applications, VMs, analytics, and topology manager resources.

In a seventy-seventh use case, ECN device 120 may provide a virtual IMS network that enables mobile to mobile calls, call forwarding when no answer, call forwarding to voice mail, mobile to mobile video calls, computer to mobile video calls, video sharing, lawful intercept, DDOS mitigation, DDOS attack reporting, removing a SBC from service, adding a SBC to service, representing a SBC as a single IP address to all UEs, local authentication using EAP with mutual TLS, TSM tunneling support, Facebook integration, etc.

In a seventy-eighth use case, ECN device 120 may provide a virtual EPC network that enables M2M customer on-boarding; M2M policy provisioning (e.g., time of day use, bandwidth caps, customer group simultaneous connections, blacklist, stolen, or hijacked devices, maximum concurrent connections, location, etc.); setting a strict time of day policy; setting a loose time of day policy; setting a congestion aware time of day policy; setting a strict bandwidth policy; setting a loose bandwidth policy; setting a congestion aware bandwidth policy; setting strict customer concurrent sessions; setting loose customer concurrent sessions; setting congestion aware customer concurrent sessions; handling of no mobility; handling of M2M policy violation; etc.

Systems and/or methods described herein may provide a network architecture using cloud computing techniques (e.g., VMs, hypervisors, etc.) to operate, manage, and scale systems of the network architecture. The systems and/or methods may lay a foundation for a transition from dedicated hardware-based network systems to using data center class computer systems for virtual network implementation. The systems and/or methods may create highly scalable virtual networks with lower operational and capital costs than current dedicated networks, and may provide network primitives that collect operational information associated with the virtual networks.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 12-15, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a device, network infrastructure requirements from a user, wherein the network infrastructure requirements include information of network resources required for a virtual network to be implemented and the network resources include one or more devices; determining, by the device, availabilities of the network resources based on the network infrastructure requirements; providing, by the device and to the user, recommendations of one or more of the network resources to be used in the virtual network based on the availabilities of the network resources; receiving, by the device, user-selected network resources based on the recommendations; creating, by the device, a virtual network template for testing, wherein the user-selected network resources are logically connected in the virtual network template; testing, by the device, the virtual network template; and deploying, by the device, the virtual network template via the user-selected network resources when the testing of the virtual network template is successful, wherein deploying the virtual network template comprises: performing a current state analysis of attributes to operate the user-selected network resources, wherein the attributes include at least one of a bandwidth, processor utilization, memory utilization, or concurrent flows; performing a future state analysis of the attributes; modifying security policies associated with the user-selected network resources so that the user-selected network resources can be instantiated; instantiating the user-selected network resources, performing load balancing for the user-selected network resources; performing performance management collection, modeling, and tracking for the user-selected network resources; providing a health check for the user-selected network resources; and providing rate shaping requirements for the user-selected network resources, wherein the rate shaping requirements ensure at least one of delivery of a priority application without delay, quality of service, defense against bandwidth-abusing denial of service attacks, protection against traffic spikes, abusive users, or network attacks.

2. The method of claim 1, further comprising: verifying requirements for the user-selected network resources prior to testing the virtual network template, wherein the requirements for the user-selected network resources include networking attributes required for the user-selected network resources, and the networking attributes include at least one of a bandwidth, processor utilization, memory utilization, or concurrent flows.

3. The method of claim 1, further comprising verifying requirements for the user-selected network resources prior to testing the virtual network template, wherein verifying the requirements for the user-selected network resources includes one or more of: specifying at least one of performance management parameters, failover requirements, scaling requirements, and upgrade parameters associated with the user-selected network resources; selecting network primitives for the user-selected network resources; preparing a resource plan for the user-selected network resources; planning maintenance events for the user-selected network resources; and preparing a scale and performance model for the user-selected network resources.

4. The method of claim 1, where receiving network infrastructure requirements comprises: providing for display, to the user, a catalog of representations of the network resources; receiving, from the user, selection of particular representations of the network resources; and determining the network infrastructure requirements based on the particular representations of the network resources.

5. The method of claim 1, where the user-selected network resources provide a virtual network to subscribers of the virtual network.

6. The method of claim 1, wherein the load balancing for the user-selected network resources is performed between two geographical locations.

7. The method of claim 1, further comprising: providing a cost of deploying the virtual network presented in the virtual network template.

8. A device, comprising: a memory; and a processor to: receive network infrastructure requirements, wherein the network infrastructure requirements include information of network resources required for a virtual network to be implemented and the network resources include one or more devices, determine availabilities of the network resources based on the network infrastructure requirements, recommend one or more of the network resources to be used in the virtual network, based on the availabilities of the network resources, receive selection of particular network resources from the recommended one or more network resources, create a virtual network template for testing, wherein representations of the particular network resources are logically connected in the virtual network template, test the virtual network template, and deploy the virtual network template via the particular network resources when the testing of the virtual network template is successful, wherein when deploying the virtual network template, the processor is further to: perform a current state analysis of attributes to operate the particular network resources, wherein the attributes include at least one of a bandwidth, processor utilization, memory utilization, or concurrent flows, perform a future state analysis of the attributes, modify security policies associated with the particular network resources so that the particular network resources can be instantiated, instantiate the particular network resources, perform load balancing for the particular network resources, perform performance management collection, modeling, and tracking for the particular network resources, provide a health check for the particular network resources, and provide rate shaping requirements for the particular network resources, wherein the rate shaping requirements ensure at least one of delivery of a priority application without delay, quality of service, defense against bandwidth-abusing denial of service attacks, protection against traffic spikes, abusive users, or network attacks.

9. The device of claim 8, where the processor is further to: verify requirements for the particular network resources prior to testing the virtual network template wherein the requirements for the particular network resources include networking attributes required for the particular network resources, and the networking attributes include at least one of a bandwidth, processor utilization, memory utilization, or concurrent flows.

10. The device of claim 8, where, the processor is further to verify requirements for the particular network resources prior to testing the virtual network template by one or more of: specifying at least one of performance management parameters, failover requirements, scaling requirements, and upgrade parameters associated with the particular network resources, selecting network primitives for the particular network resources, preparing a resource plan for the particular network resources, planning maintenance events for the particular network resources, and preparing a scale and performance model for the particular network resources.

11. The device of claim 8, where, when receiving network infrastructure requirements, the processor is further to: provide for display a catalog of representations of the network resources, receive selection of particular representations of the network resources, and determine the network infrastructure requirements based on the particular representations of the network resources.

12. The device of claim 8, where the processor is further to: determine that the testing of the virtual network template is unsuccessful, recommend alternative network resources based on the unsuccessful test, receive selection of one or more of the alternative network resources from the recommended alternative network resources, connect the selected alternative network resources to create an alternative virtual network template, and test the alternative virtual network template.

13. The device of claim 8, wherein the processor performs the load balancing for the user-selected network resources between two geographical locations.

14. The device of claim 8, wherein the processor is further to provide a cost of deploying the virtual network presented in the virtual network template.

15. A non-transitory computer-readable medium, comprising: one or more instructions that, when executed by a processor of a device, cause the processor to: receive network infrastructure requirements, wherein the network infrastructure requirements include information of network resources required for a virtual network to be implemented and the network resources include one or more devices, determine availabilities of the network resources based on the network infrastructure requirements, recommend one or more of the network resources to be used in the virtual network, based on the availabilities of the network resources, receive selection of particular network resources from the recommended one or more network resources, create a virtual network template for testing, wherein representations of the particular network resources are connected in the virtual network template, verify requirements for the particular network resources, test the virtual network template, and deploy the virtual network template via the particular network resources when the testing of the virtual network template is successful, wherein when verifying requirements for the particular network resources, the computer-readable medium further comprises: one or more instructions that, when executed by the processor, cause the processor to specify networking attributes associated with the particular network resources, wherein when deploying the virtual network template, the computer-readable medium further comprises: one or more instructions that, when executed by the processor, cause the processor to one or more of: perform a current state analysis of attributes to operate the particular network resources, wherein the attributes include at least one of a bandwidth, processor utilization, memory utilization, or concurrent flows, perform a future state analysis of the attributes, modify security policies associated with the particular network resources so that the particular network resources can be instantiated, instantiate the particular network resources, perform load balancing for the particular network resources, perform performance management collection, modeling, and tracking for the particular network resources, provide a health check for the particular network resources, and provide rate shaping requirements for the particular network resources, wherein the rate shaping requirements ensure at least one of delivery of a priority application without delay, quality of service, defense against bandwidth-abusing denial of service attacks, protection against traffic spikes, abusive users, or network attacks.

16. The non-transitory computer-readable medium of claim 15, where, when verifying requirements for the particular network resources, the computer-readable medium further comprises: one or more instructions that, when executed by the processor, cause the processor to one or more of: specify at least one of performance management parameters, failover requirements, scaling requirements, and upgrade parameters associated with the particular network resources, select network primitives for the particular network resources, prepare a resource plan for the particular network resources, plan maintenance events for the particular network resources, and prepare a scale and performance model for the particular network resources.

17. The non-transitory computer-readable medium of claim 15, where, when receiving network infrastructure requirements, the computer-readable medium further comprises: one or more instructions that, when executed by the processor, cause the processor to one or more of: provide for display a catalog of representations of the network resources, receive selection of particular representations of the network resources, and determine the network infrastructure requirements based on the particular representations of the network resources.

18. The non-transitory computer-readable medium of claim 15, further comprising: one or more instructions that, when executed by the processor, cause the processor to one or more of: determine that the testing of the virtual network template is unsuccessful, recommend alternative network resources based on the unsuccessful test, receive selection of one or more of the alternative network resources from the recommended alternative network resources, connect the selected alternative network resources to create an alternative virtual network template, and test the alternative virtual network template.

19. The non-transitory computer-readable medium of claim 15, wherein the processor performs the load balancing for the user-selected network resources between two geographical locations.

20. The non-transitory computer-readable medium of claim 15, further comprising: one or more instructions that, when executed by the processor, cause the processor to provide a cost of deploying the virtual network presented in the virtual network template.

* * * * *